United States Patent
Ishikawa et al.

(10) Patent No.: US 10,638,046 B2
(45) Date of Patent: Apr. 28, 2020

(54) WEARABLE DEVICE, CONTROL APPARATUS, PHOTOGRAPHING CONTROL METHOD AND AUTOMATIC IMAGING APPARATUS

(71) Applicant: SONY CORPORATION, Tokyo (JP)

(72) Inventors: Hirotaka Ishikawa, Kanagawa (JP); Takeshi Iwatsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/437,323

(22) Filed: Jun. 11, 2019

(65) Prior Publication Data

US 2019/0297240 A1    Sep. 26, 2019

Related U.S. Application Data

(63) Continuation of application No. 15/118,513, filed as application No. PCT/JP2015/000195 on Jan. 19, 2015, now Pat. No. 10,356,322.

(30) Foreign Application Priority Data

Feb. 21, 2014    (JP) .................................. 2014-032355

(51) Int. Cl.
*H04N 5/232*    (2006.01)
*G02C 11/00*    (2006.01)
*G02B 27/01*    (2006.01)

(52) U.S. Cl.
CPC ....... *H04N 5/2327* (2013.01); *G02B 27/0172* (2013.01); *G02C 11/10* (2013.01);
(Continued)

(58) Field of Classification Search
CPC ........... H04N 5/23216; H04N 5/23222; H04N 5/23258; H04N 5/2327; G02B 27/0172;
(Continued)

(56) References Cited

U.S. PATENT DOCUMENTS 10,185,163 B2*   1/2019  Blum ..................... G02C 11/10
                                                         348/294
10,356,322 B2*   6/2019  Ishikawa ............ H04N 5/23227
                                                         348/208.2
(Continued)

FOREIGN PATENT DOCUMENTS

CN          101141568 A      3/2008
CN          101341734 A      1/2009
(Continued)

OTHER PUBLICATIONS

International Search report and Written Opinion of PCT Application No. PCT/JP2015/000195, dated Apr. 1, 2015, 13 pages.

(Continued)

*Primary Examiner* — Marly S Camargo
(74) *Attorney, Agent, or Firm* — Chip Law Group

(57) ABSTRACT

There is provided a wearable device including an attachment unit, a motion sensor and a control unit. The attachment unit has a display and an imaging unit. The attachment unit is attachable to the user. The motion sensor is capable of detecting a spatial movement of the imaging unit. The control unit determines whether or not the imaging unit is in a predetermined resting state, based on an output of the motion sensor, and when the imaging unit is not in the predetermined resting state, limit a photographing operation of the imaging unit.

9 Claims, 25 Drawing Sheets

(52) U.S. Cl.
CPC ..... *H04N 5/23216* (2013.01); *H04N 5/23222* (2013.01); *H04N 5/23258* (2013.01); *G02B 2027/014* (2013.01); *G02B 2027/0138* (2013.01); *G02B 2027/0178* (2013.01)

(58) Field of Classification Search
CPC ............ G02B 2027/0178; G02C 11/10; G02C 11/00; G02N 11/00
USPC .......... 348/231.9, 231.99, 362, 221.1, 222.1, 348/208.2, 208.4, 208.99, 211.99, 348/211.1–211.13, 333.1; 345/156, 633
See application file for complete search history.

(56) References Cited

U.S. PATENT DOCUMENTS

| | | |
|---|---|---|
| 2005/0174470 A1 | 8/2005 | Yamasaki |
| 2005/0203430 A1* | 9/2005 | Williams ................. A61B 5/04 600/513 |
| 2007/0230931 A1* | 10/2007 | Nomura ................. G03B 17/00 396/55 |
| 2008/0007620 A1* | 1/2008 | Wang ........................ H04N 7/18 348/154 |
| 2008/0062291 A1 | 3/2008 | Sako et al. |
| 2010/0171846 A1 | 7/2010 | Wood et al. |
| 2010/0171849 A1* | 7/2010 | Wood ..................... H04N 5/228 348/231.99 |
| 2012/0007996 A1 | 1/2012 | Bilcu |
| 2013/0265440 A1 | 10/2013 | Mizuta |
| 2013/0278631 A1 | 10/2013 | Border et al. |
| 2013/0335573 A1 | 12/2013 | Forutanpour et al. |
| 2014/0204245 A1 | 7/2014 | Wexler et al. |
| 2015/0022447 A1* | 1/2015 | Hare ...................... G06F 3/0304 345/158 |
| 2015/0268471 A1 | 9/2015 | Sako et al. |
| 2016/0057339 A1 | 2/2016 | Raffle et al. |
| 2016/0253006 A1 | 9/2016 | Lyons |
| 2016/0334628 A1 | 11/2016 | Lyons |
| 2017/0069135 A1 | 3/2017 | Komaki et al. |

FOREIGN PATENT DOCUMENTS

| | | |
|---|---|---|
| CN | 103209292 A | 7/2013 |
| CN | 103369243 A | 10/2013 |
| EP | 1793580 A1 | 6/2007 |
| EP | 1898632 A1 | 3/2008 |
| JP | 2008-067219 A | 3/2008 |
| JP | 4165568 B2 | 10/2008 |
| JP | 4912410 B2 | 4/2012 |
| JP | 2013-219541 A | 10/2013 |
| KR | 10-2008-0093970 A | 10/2008 |
| WO | 2007/067335 A1 | 6/2007 |
| WO | 2009/053863 A1 | 4/2009 |
| WO | 2014/048330 A1 | 4/2014 |

OTHER PUBLICATIONS

International Preliminary Report on Patentability for PCT Application No. PCT/JP2015/000195, dated Aug. 3, 2016, 10 pages.

Non-Final Office Action for U.S. Appl. No. 15/118,513, dated Sep. 26, 2017, 35 pages.

Final Office Action for U.S. Appl. No. 15/118,513, dated Apr. 30, 2018, 29 pages.

Non-Final Office Action for U.S. Appl. No. 15/118,513, dated Sep. 19, 2018, 38 pages.

Advisory Action for U.S. Appl. No. 15/118,513, dated Jul. 20, 2018, 2 pages.

Notice of Allowance for U.S. Appl. No. 15/118,513, dated Mar. 6, 2019, 23 pages.

* cited by examiner

WEARABLE DEVICE, CONTROL APPARATUS, PHOTOGRAPHING CONTROL METHOD AND AUTOMATIC IMAGING APPARATUS

CROSS REFERENCE TO RELATED APPLICATIONS

The present application is a continuation application of U.S. patent application Ser. No. 15/118,513, filed Aug. 16, 2016 which is a National Stage Entry of PCT/JP2015/000195, filed Jan. 19, 2015, and claims the benefit of priority from prior Japanese Patent Application JP 2014-032355, filed in Japan Patent Office on Feb. 21, 2014, the entire content of which is incorporated herein by reference.

TECHNICAL FIELD

The present disclosure relates to a wearable device having a camera capable of photographing a still image, a control apparatus which controls it, a photographing control method and an automatic imaging apparatus.

BACKGROUND ART

A head mount display which can be mounted on the head of a user and can show the user an image by a display to be placed in front of the user's eyes has been known. For example, in Patent Literature 1, a spectacle type display camera (imaging display apparatus) having a display panel unit which can display an image sent from an external apparatus; and an imaging lens which images a subject in the direction of a user's eyesight has been described.

Meanwhile, in addition to a normal imaging apparatus which performs imaging by the user's operation, there has been known an automatic imaging apparatus which performs imaging automatically without making the user conscious of it. For example, in Patent Literature 2, an automatic imaging apparatus which can be used in a state of being attached to the user's body by a strap or the like, and can be used as a life-log camera to record the user's daily activities by images, has been described.

CITATION LIST

Patent Literature

[PTL 1]
Japanese Patent Application Laid-open No. 2013-141272
[PTL 2]
Japanese Patent Application Laid-open No. 2009-147647

SUMMARY

Technical Problem

A head mount display having a camera may have a problem that when the imaging is performed while the user's head is moving, image blur may occur, and it might be difficult to obtain significant image as intended by the user.

In view of the circumstances as described above, it is desirable to provide a wearable device capable of obtaining images significant for a user, a control apparatus which controls it, a photographing control method and an automatic imaging apparatus.

Solution to Problem

According to an embodiment of the present disclosure, there is provided a wearable device including an attachment unit, a motion sensor and a control unit.

The attachment unit has a display and an imaging unit. The attachment unit is configured to be attachable to the user.

The motion sensor is configured to be capable of detecting a spatial movement of the imaging unit.

The control unit is configured to determine whether or not the imaging unit is in a predetermined resting state, based on an output of the motion sensor, and when the imaging unit is not in the predetermined resting state, limit a photographing operation of the imaging unit.

The wearable device is configured to limit the photographing operation of the imaging unit when the imaging unit is not in the predetermined resting state. This makes it possible to inhibit photographing images insignificant for a user, and allow photographing only images significant for a user.

The "predetermined resting state" includes not only the state where the attachment unit is standing still but also the state where the attachment unit is moving in an extent that it does not affect photographing. Typically, whether or not the imaging unit is in the predetermined resting state may be determined according to whether or not the output of the motion sensor, or the amount of change thereof, is not more than a predetermined threshold.

As the motion sensor, typically, an acceleration sensor capable of detecting accelerations uniaxially, biaxially or triaxially; an angular velocity sensor capable of detecting angular velocities uniaxially, biaxially or triaxially; or combination thereof may be employed.

To "limit a photographing operation of the imaging unit" typically means inhibiting acquisition of a photographed image when the attachment unit is not in the predetermined resting state. Examples of controlling to inhibit acquisition of an image include controlling to invalidate the photographing operation (do not allow photographing); permit photographing but avoid regarding the image as valid (do not save); refrain from photographing until the imaging unit becomes in the predetermined resting state; and the like.

For example, the control unit may be configured to, when determined that the imaging unit is not in the predetermined resting state, inhibit starting of the imaging unit until the imaging unit becomes in the predetermined resting state.

Alternatively, the control unit may be configured to, when determined that the imaging unit is not in the predetermined resting state, invalidate a photographing operation of the imaging unit; and after a predetermined time has passed, determine again whether or not the imaging unit is in the predetermined resting state.

The control unit may have a signal generator and a determination unit.

The signal generator is configured to generate a starting signal for starting the imaging unit, every time a predetermined time passes.

The determination unit is configured to determine whether or not the imaging unit is in the predetermined resting state, when the starting signal is generated. The determination unit is configured to permit acquisition of an image when the imaging unit is in the predetermined resting state, and inhibit the acquisition of an image when the imaging unit is not in the predetermined resting state.

Thus, for example, in cases where automatic photography is performed at a predetermined time interval without user's operations, it makes it possible to obtain only images significant for the user.

The time to determine whether or not the imaging unit is in the predetermined resting state is not especially limited, and it may be before photographing, during photographing, or after photographing.

That is, the determination unit may be configured to determine whether or not the imaging unit is in the predetermined resting state, after the starting signal is generated and before the photographing operation of the imaging unit is performed.

Or, the determination unit may be configured to determine whether or not the imaging unit is in the predetermined resting state, after the photographing operation of the imaging unit is performed.

Or, the determination unit may be configured to determine the predetermined resting state, according to whether or not the imaging unit has been in the predetermined resting state during an exposure period of the imaging unit.

Examples of controlling to inhibit acquisition of an image, when the imaging unit is not in the predetermined resting state, include controlling to invalidate the photographing operation (do not allow photographing); permit photographing but avoid regarding the image as valid (do not save); refrain from photographing until the imaging unit becomes in the predetermined resting state; and the like.

For example, the determination unit may be configured to, when determined that the imaging unit is not in the predetermined resting state, inhibit starting of the imaging unit until the imaging unit becomes in the predetermined resting state.

Alternatively, the determination unit may be configured to, when determined that the imaging unit is not in the predetermined resting state, invalidate a photographing operation of the imaging unit until the imaging unit becomes in the predetermined resting state.

Besides, the wearable device may further include an operation unit to be operated by an input operation by a user. In this case, the control unit has a determination unit to detect an input of the operation unit. The determination unit is configured to determine whether or not the imaging unit is in the predetermined resting state, when the operation unit is operated. The determination unit is configured to permit acquisition of an image by the imaging unit when the imaging unit is in the predetermined resting state, and inhibit the acquisition of an image when the imaging unit is not in the predetermined resting state.

Thus, in such cases as when taking still images by the user's operations, it makes it possible to obtain only images significant for the user.

The time to determine whether or not the imaging unit is in the predetermined resting state is not especially limited, and it may be before photographing, during photographing, or after photographing.

That is, the determination unit may be configured to determine whether or not the imaging unit is in the predetermined resting state, after detecting the input of the operation unit and before the photographing operation of the imaging unit is performed.

Or, the determination unit may be configured to determine whether or not the imaging unit is in the predetermined resting state, after the photographing operation of the imaging unit is performed.

Or, the determination unit may be configured to determine the predetermined resting state, according to whether or not the imaging unit has been in the predetermined resting state during an exposure period of the imaging unit.

The control unit may further have an image transmitting unit configured to send the image photographed by the imaging unit to an external apparatus.

With this configuration of the control unit, it may eliminate the need of adding extra memory or enlarging the memory for saving images.

In this case, an image may be saved associated with information regarding situation of photographing of the image. Examples of the information regarding situation of photographing of the image include a photographing place, a photographing time, and an output value from the motion sensor at the time of obtaining the image, and the like.

According to another embodiment of the present disclosure, there is provided a wearable device including an attachment unit, a motion sensor and a control unit.

The attachment unit has a display and an imaging unit. The attachment unit is configured to be attachable to the user.

The motion sensor is configured to detect a spatial movement of the imaging unit.

The control unit is configured to allow the imaging unit to perform a photographing operation at a predetermined timing regardless of absence of any input operation by the user. The control unit is configured to determine whether or not the imaging unit is in a predetermined resting state, based on an output of the motion sensor, and when the imaging unit is not in the predetermined resting state, make a correction on a photographing operation of the imaging unit.

According to still another embodiment of the present disclosure, there is provided a control apparatus including a receiver and a determination unit.

The receiver is configured to be capable of receiving, from a wearable device having an imaging unit and a motion sensor to detect a spatial movement of the imaging unit, an image photographed by the imaging unit and an output of the motion sensor.

The determination unit is configured to determine whether or not the imaging unit is in a predetermined resting state, based on an output of the motion sensor. The determination unit is configured to permit acquisition of an image by the imaging unit when the imaging unit is in the predetermined resting state, and inhibit the acquisition of an image when the imaging unit is not in the predetermined resting state.

According to still another embodiment of the present disclosure, there is provided a photographing control method including detecting an input of a starting signal for starting an imaging unit installed in a wearable device.

By a motion sensor installed in the wearable device, a spatial movement of the imaging unit is detected.

Whether or not the imaging unit is in a predetermined resting state is determined.

When the imaging unit is in the predetermined resting state, acquisition of an image by the imaging unit is permitted.

When the imaging unit is not in the predetermined resting state, the acquisition of an image is inhibited.

According to still another embodiment of the present disclosure, there is provided an automatic imaging apparatus including an imaging unit, a motion sensor, a signal generator and a determination unit.

The motion sensor is configured to detect a spatial movement of the imaging unit.

The signal generator is configured to generate a starting signal for starting the imaging unit, every time a predetermined time passes.

The determination unit is configured to determine whether or not the imaging unit is in a predetermined resting state, based on an output of the motion sensor, when the starting signal is generated. The determination unit is configured to permit acquisition of an image when the imaging unit is in the predetermined resting state, and inhibit the acquisition of an image when the imaging unit is not in the predetermined resting state.

Advantageous Effects of Invention

As described above, according to the present disclosure, it makes it possible to obtain images significant for a user. Note that the effect described here is not necessarily limited, but it may be any of the effects described in the present disclosure.

DESCRIPTION OF EMBODIMENTS

Hereinafter, some embodiments of the present disclosure will be described with reference to the drawings.

First Embodiment (Overall Configuration of Information Processing System Using Wearable Device)

Figure 1:
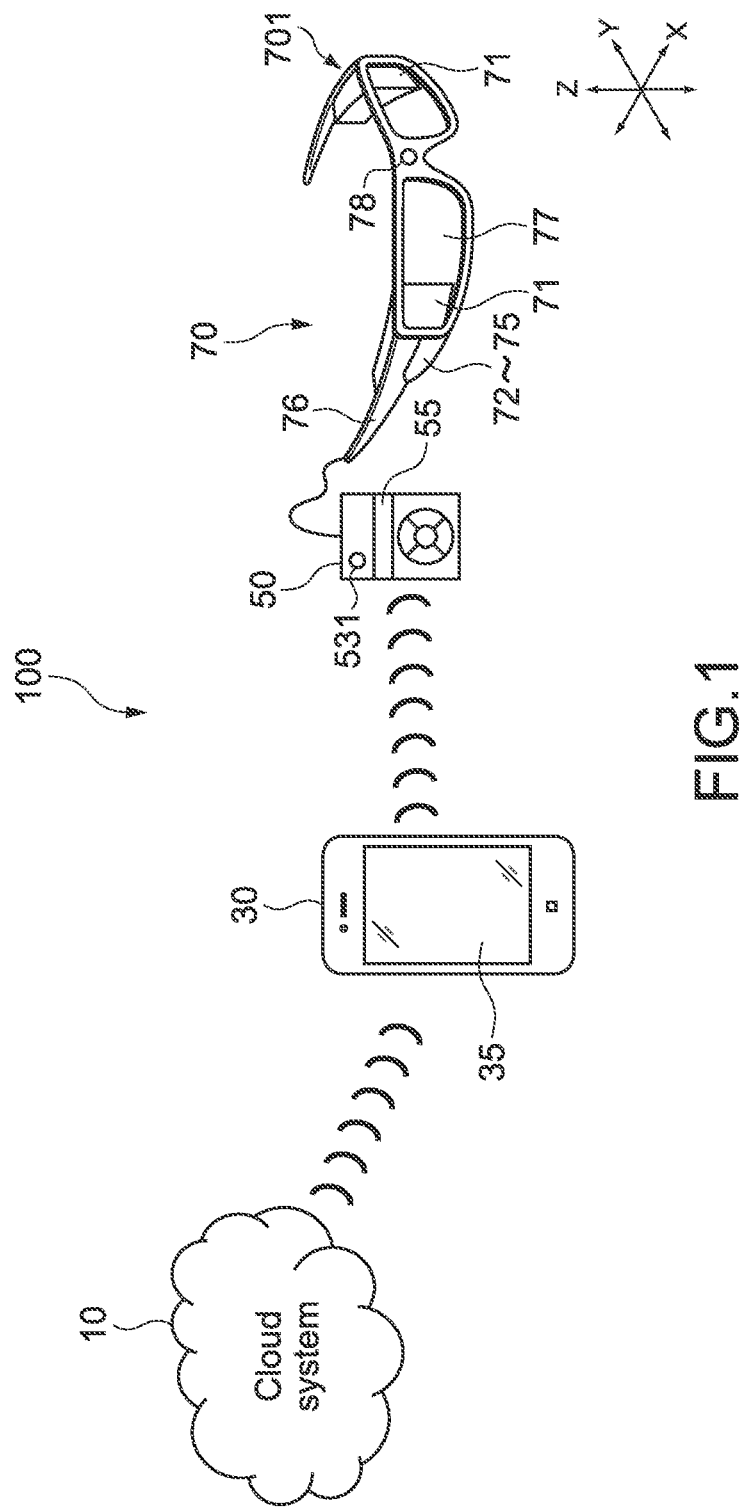
FIG. 1 shows a configuration of an information processing system according to the present disclosure.

FIG. 1 shows a configuration of an information processing system according to the present disclosure.

This system 100 mainly includes a mobile terminal 30, a wearable device (wearable display) 70, and a control box 50 which functions as a control apparatus to control the wearable device 70.

The mobile terminal 30 functions as an information processing apparatus. Typically, the mobile terminal 30 may be a mobile phone such as a smartphone. The mobile terminal 30 may also be a tablet apparatus or other things such as a PC (Personal Computer).

The wearable device 70 is a head-mount type device as shown in the figure; but it is not limited thereto, and it may also be a wrist-band type or neck-band type device, for example.

The mobile terminal 30 is connectable to a cloud system 10. The cloud system 10 includes, for example, a server computer or the like being connected to an electric communication line network such as the Internet.

Typically, the control box 50 is connected to the wearable device 70 via wired connection. A user may operate the wearable device 70 by mounting the wearable device 70 on the head and operating the control box 50 with the fingers.

(Configuration of Each Apparatus)

Figure 2:
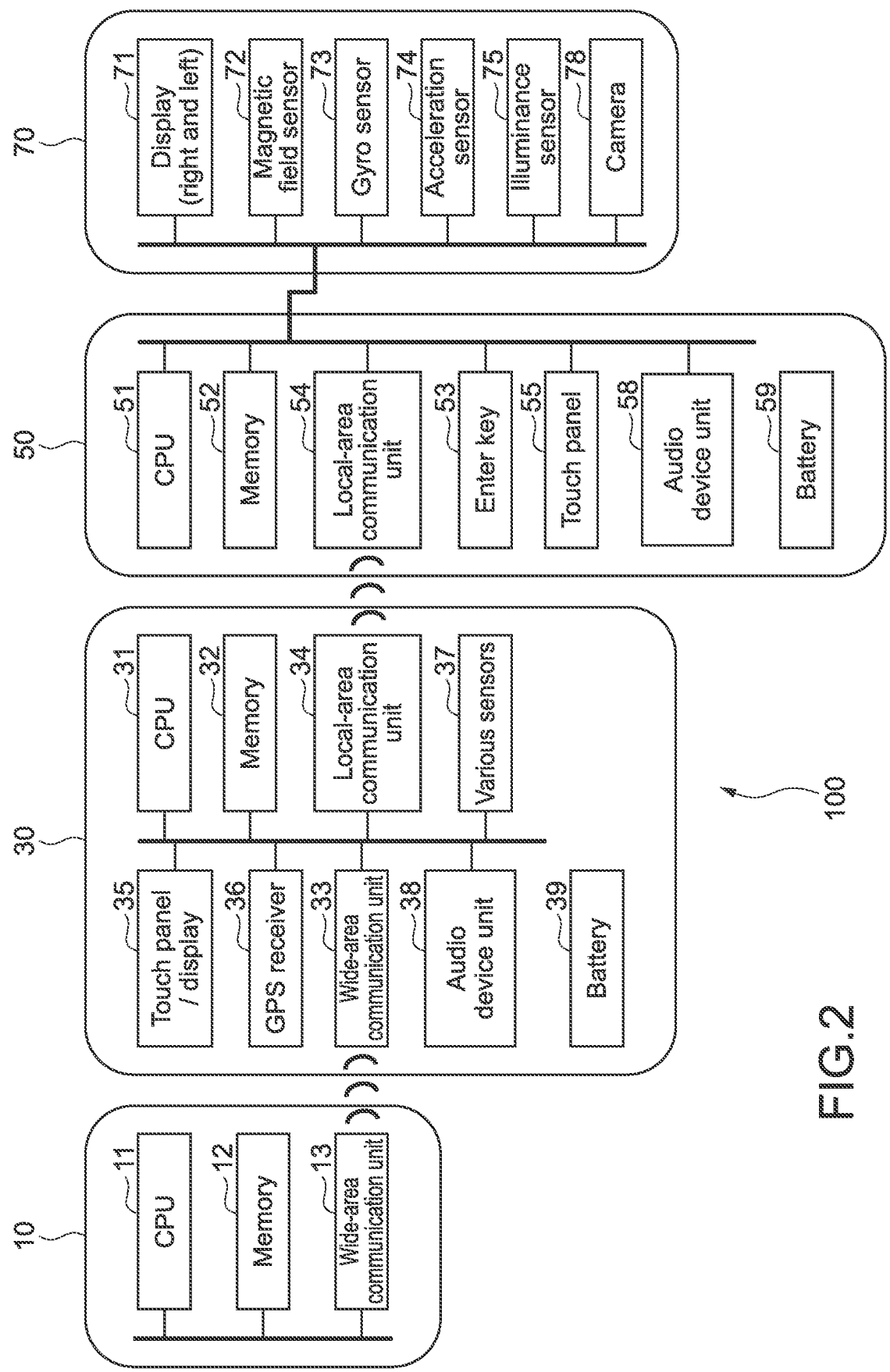
FIG. 2 is a block diagram showing a configuration of each apparatus in this system.

FIG. 2 is a block diagram showing a configuration of each apparatus of the system 100.

(Mobile Terminal)

The mobile terminal 30 (for example, smartphone) mainly includes a CPU (Central Processing Unit) 31, a memory 32, a touch panel/display 35, a wide-area communication unit 33 and a local-area communication unit 34. The mobile terminal 30 further includes various sensors 37 including a motion sensor, a camera, and the like; a GPS (Global Positioning System) receiver 36; an audio device unit 38; a battery 39; and the like. At least the mobile terminal 30 (or, the mobile terminal 30 and the cloud system 10) functions as an external apparatus with respect to the wearable apparatus 70.

The wide-area communication unit 33 is capable of performing communication using a communication system such as 3G (Third Generation) and LTE (Long Term Evolution), for example. The local-area communication unit 34 is capable of performing communication using a wireless LAN (Local Area Network) communication system such as WiFi; and/or a short-range wireless communication system such as Bluetooth (registered trademark) and infrared system; for example. The local-area communication unit 34 functions as a "receiver" and a "transmission unit" between the local-area communication unit 34 and the control box 50.

The mobile terminal 30 may also have an identifying communication device that uses a so-called near-field wireless communication system such as RFID (Radio Frequency IDentification), for example, independently from the local-area communication unit 34.

The audio device unit 38 includes a microphone and a speaker.

(Wearable Device)

The wearable device 70 has an attachment unit 701 configured to be attachable to the user's head. The attachment unit 701 has a display 71, various sensors 72 to 75, a camera 78, and the like.

The display 71 may include, for example, small-size projectors disposed on right and left sides of a frame 76 of the head-mount type wearable device 70, as shown in FIG. 1. In this head-mount type wearable device 70, each image light projected from the corresponding projector, the image light being the same or having a parallax between the projectors, would be guided by a light-guiding plate 77. The guided image light would be projected from predetermined regions of the light-guiding plate 77 to the user's eyes.

Note that it is also possible that the wearable device 70 has the display 71 only on one side of right and left. The wearable device 70 is not limited to the projector type device; and it may have another type of the display 71 which directly emits the image light to the eyes.

Examples of the various sensors of the wearable device 70 include a magnetic field sensor 72, a gyro sensor 73, an acceleration sensor 74, an illuminance sensor and the like. The wearable device 70 may also be provided with a sensor for detecting the eyesight direction (directions and angles of elevation and depression), or the like, mounted thereon.

The gyro sensor 73 (angular velocity sensor) and the acceleration sensor 74 are configured to serve as a motion sensor to detect a spatial movement of the attachment unit 701.

The gyro sensor 73 is configured as a triaxial gyro sensor capable of detecting angular velocities around the X-axis, Y-axis and Z-axis, of the attachment unit 701. The X-axis corresponds to the direction of the eyesight of the user; the Y-axis corresponds to right-and-left direction; and the Z-direction corresponds to the up-and-down direction. Typically, the gyro sensor 73 has a sensor element to detect the angular velocity around the X-axis (roll direction); a sensor element to detect the angular velocity around the Y-axis (pitch direction); and a sensor element to detect the angular velocity around the Z-axis (yaw direction).

The acceleration sensor 74 is configured as a triaxial acceleration sensor capable of detecting accelerations of the X-axis, Y-axis and Z-axis, of the attachment unit 701. Typically, the acceleration sensor 74 has a sensor element to detect the acceleration along the X-axis direction; a sensor element to detect the acceleration along the Y-axis direction; and a sensor element to detect the acceleration along the Z-axis direction.

Note that the configuration of the gyro sensor 73 is not limited to that of the triaxial sensor, but may be configured by a sensor capable of detecting the angular velocity around at least one axis. Similarly, the configuration of the acceleration sensor 74 is not limited to that of the triaxial sensor, but may be configured by a sensor capable of detecting the acceleration along at least one axis.

The camera 78 is configured as an imaging unit capable of photographing a subject in the user's eyesight direction, for example. The camera 78 is mounted on the attachment unit 701. In this embodiment, the camera 78 is disposed between the right and left components of the display 71 (see FIG. 1). Note that the position that the camera 78 is mounted is not limited to the above-described one. For example, the camera 78 may be configured to photograph a subject in a direction other than the user's eyesight direction.

The camera 78 is capable of photographing still images and video images. As will be described later, the camera 78 is configured to be able to be driven in an interval shooting mode for automatically photographing a still image every time a predetermined time passes, in addition to a normal shooting mode which is based on the user's operation.

Typically, the camera 78 is made up of an imaging element such as a CMOS (Complementary Metal Oxide Semiconductor) sensor and a CCD (Charge Coupled Device) sensor.

(Control Box)

The control box 50 includes a CPU 51, a memory 52, a local-area communication unit 54, an enter key 53, a touch panel 55, an audio device unit 58; a battery 59; and the like.

The control box 50 may be configured as an auxiliary apparatus of the wearable device 70 (for example, a part of the wearable device 70), or may be configured as a controller independent from the wearable device 70.

The CPU 51 totally controls each part in the control box 50 and the wearable device 70. The control box 50 may also have a PLD (Programmable Logic Device) such as a FPGA (Field Programmable Gate Array) instead of the CPU 51.

The memory 52 temporally stores a program to be executed by the CPU 51, and parameters calculated by execution of this program. The memory 52 is also configured to be capable of saving outputs coming from various sensors such as the gyro sensor 73 and the acceleration sensor 74, at predetermined time intervals.

The local-area communication unit 54 is communicable with the local-area communication unit 34 of the mobile terminal 30 by the above-mentioned communication system. The local-area communication unit 54 functions as a "receiver", or a "transmission unit", between the local-area communication unit 54 and the mobile terminal 30.

The enter key 53 includes at least one physical key to be operated by the user, disposed on the control box 50. The enter key 53 includes, for example, a power key; a back key; an ON/OFF key of the display 71; and a shutter button 531 of the camera 78 (see FIG. 1). The shutter button 531 is configured to serve as an operation unit to be operated by an input operation by the user at the time of shooting. The shutter button 531 may function as a shutter button in a still-image shooting mode, and may function as a start-shooting button in a video-image shooting mode.

The touch panel 55 is an operating device to be operated by the user, disposed on a surface of the control box 50 (see FIG. 1).

The audio device unit 58 includes a microphone and a speaker.

The control box 50 may also have a communication device that uses the above-mentioned near-field wireless communication system such as RFID, for example, independently from the local-area communication unit 54. This may enable the user to perform pairing between the mobile terminal 30 close to the control box 50 in an almost automatic manner, by starting given application software in the mobile terminal 30 and bringing the mobile terminal 30 close to the control box 50.

Further, for example, it is also possible to make the mobile terminal 30 download and install the application software for the pairing, from the cloud, in an almost automatic manner, by the user's action of bringing the mobile terminal 30 close to the control box 50.

As a matter of course, even without such devices for near-field wireless communication, it is also possible that the control box 50 may be capable of performing the pairing with the mobile terminal 30 by using the local-area communication unit 54.

(Cloud System)

The server computer, for example, which is included in the cloud system 10, has a CPU 11; a memory 12; and a wide-area communication unit 13 configured to be communicable with the mobile terminal 30.

(Software Configuration)

Figure 3:
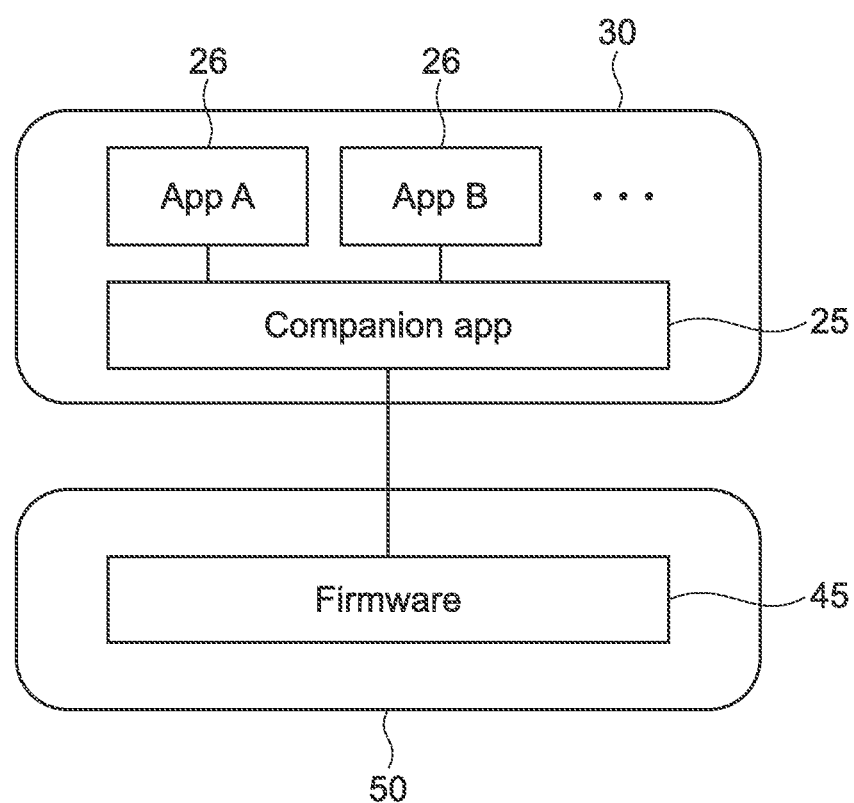
FIG. 3 shows configuration of software installed in each of a mobile terminal and a control box in this system.

FIG. 3 shows configuration of software installed in each of the mobile terminal 30 and the control box 50.

The mobile terminal 30 stores common application software (hereinafter simply referred to as an "app") 26 and a companion app 25 in its memory 32. These apps 25 and 26 are configured to work on an OS (Operating System) that has been installed by default in the mobile terminal 30.

Examples of the kinds of the common apps 26 include a SNS (Social Networking Service) app for mini-blogs and community sites; a sound recognition app; a camera app; a media reproduction app; a news app; a weather forecast service app; and the like.

The companion app 25 has a function of converting default data and user data on these apps into data displayable on the display 71 of the wearable device 70. For example, by the mobile terminal 30 downloading the companion app 25 from the cloud system 10, the companion app 25 is installed to this mobile terminal 30.

The control box 50 has firmware 45 in its memory 52. The firmware 45 cooperates with the companion app 25 after the pairing. In the firmware 45, the camera app to operate the camera 78, a setting app for a setting screen which will be described later, and the like, are installed by default.

(Example of Screen Displayed by Wearable Device and Example of Operation of this System)

(Example of Screen Displayed on Wearable Device)

Figure 4:
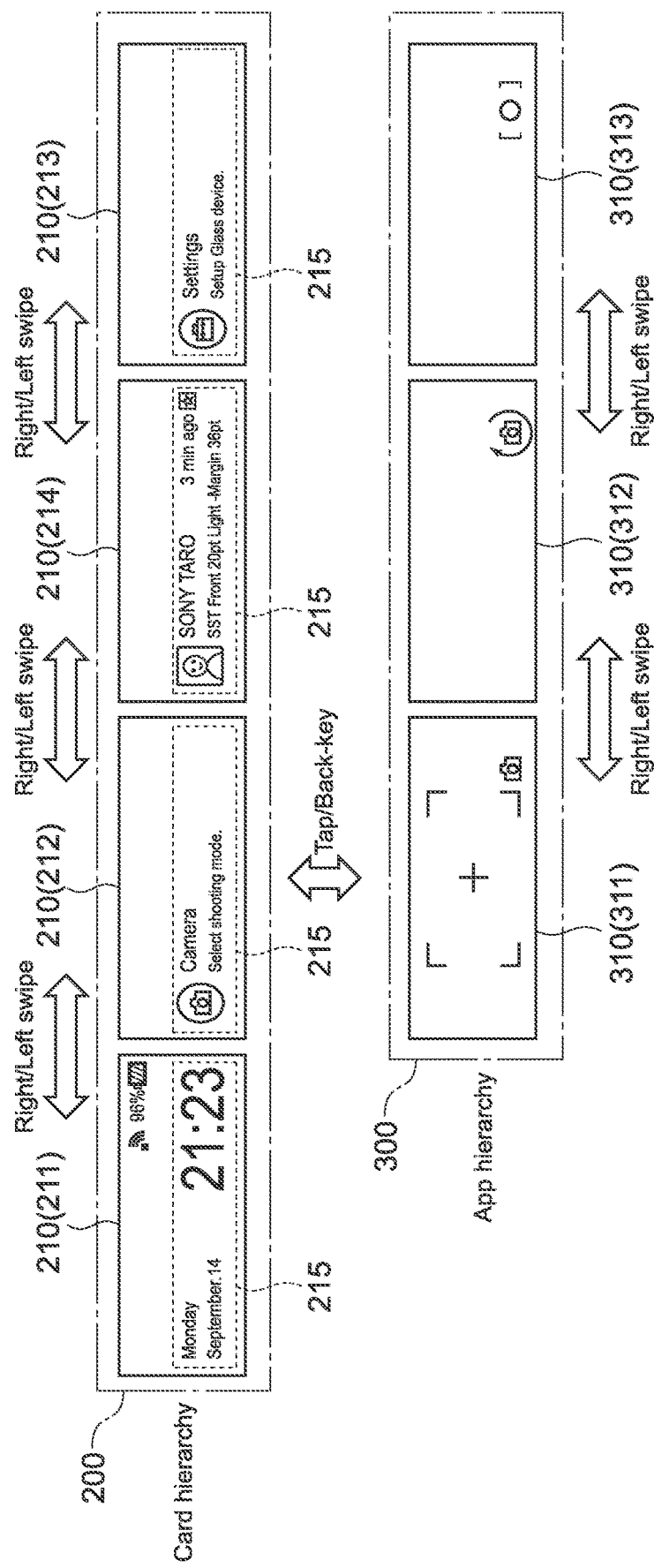
FIG. 4 shows an example of a screen displayed on a display of a wearable device in this system.

FIG. 4 shows an example of a screen displayed on the display 71 of the wearable device 70. Hereinafter, for convenience of explanation, the companion app 25 will be one that performs the processing of the mobile terminal 30; and the firmware 45 will be one that performs the processing of the control box 50.

(Example of Screen of Card Hierarchy)

The hierarchy indicated in the upper row of FIG. 4 is referred to as a "card hierarchy". The card hierarchy 200 contains a variety of card screens 210 including, for example, a home screen 211, a camera screen 212, a setting screen 213, and the like, by default. The card hierarchy 200 contains in addition a card screen 214 of the app 26 (see FIG. 3) registered by the user.

The card screens 210 contain card images 215 which may be located mainly at the bottom half region among the entire region of the card screen, for example. The card image (except for the card image of the home screen 211) as used in this context would be an image such as an icon, or widget, and this may be a GUI (Graphical User Interface) for accessing to an app. Each card screen 210 is provided with one card image 215.

The user is able to add the card screens 210 (card images 215), by registering them. For example, the user may use the mobile terminal 30 and perform an operation of registration to the app 26 installed in the mobile terminal 30, and thus the companion app 25 may generate the card image 215 corresponding to this app 26.

The card image 215 corresponding to the app is, for example, an image containing within the card image 215 a mark and characters that make it recognizable as that app. As will be described later, basically, the companion app 25 stores the card images 215 that it has generated by itself, to the memory 32. The firmware 45 also stores a given number of these card images 215, to the memory 52.

The firmware 45 in the control box 50 is configured to display these card screens 210 one by one on the display 71. In the same hierarchy, with an input of a swiping operation to right or left by the user via the touch panel 55, the firmware 45 displays each of these card screens 210 on the display 71 in order.

Note that the "Settings" that can be accessed from the setting screen 213 which is one of the card screens 210 also indicates one of the application software; which is a built-in default app in the control box 50.

(Example of Screen of App Hierarchy)

The hierarchy indicated in the lower row of FIG. 4 is referred to as an "app hierarchy 300". Basically, the app hierarchy 300 may be accessible through the card hierarchy 200. The app hierarchy 300 contains app images 310 of app screens on which the respective apps of the card screens 210 are started.

The display 71 displays these app images 310 one by one. The user is able to access the app hierarchy 300 via the card hierarchy 200. When the user intends to access the app hierarchy 300, the user taps the touch panel 55, in the state where the card screen 210 selected from the card hierarchy 200 is displayed on the display 71. Then, the firmware 45 displays the app image 310 corresponding to that card screen 210 on the display 71.

When the user intends to return from the app image 310 to the card screen 210, the user presses the back key that has been provided as the enter key 53 of the control box 50 (see FIG. 2).

Further, the user is able to switch the app images 310 within one app, by operating on the touch panel 55 to swipe to right or left, in the state where any one of the app images 310 is displayed in the app hierarchy 300. For example, it is possible to switch a first function of one app, to a second function of that app having the function different from the first function. The number of such functions (number of app images) may vary depending on the app.

In cases where the app is the camera app, as shown in FIG. 4, the app has a screen 311 indicating the still image shooting mode which is the first function; a screen 312 indicating the interval shooting mode which is the second function; a screen 313 indicating the video image shooting mode which is a third function; and the like.

Incidentally, the direction of movement of the images may be the same with the direction of swiping operation by the finger of the user, or may be opposite to this direction. This may be changed by the user's setting.

(Processing of Switching Card Screens within Card Hierarchy)

Typically, the companion app 25 of the mobile terminal 30 stores all the registered card images 215 in the memory 32. Meanwhile, the firmware 45 stores the predetermined number of card images 215 (for example, the card images 215 in the order of registration, up to the predetermined number) out of the registered card images 215, in the memory 52 in the control box 50. Then, the firmware 45 displays on the display 71 the card image 215 specified by the user via the touch panel 55, extracting the card image 215 from the memory 52. Further, the firmware 45 requests for transmission of the card image 215 from the memory 32 of the mobile terminal 30 via the companion app 25, as necessary; receives the transmitted card image 215; and displays it on the display 71. Specifically, the firmware 45 and the companion app 25 may operate in the following manner.

Figure 5:
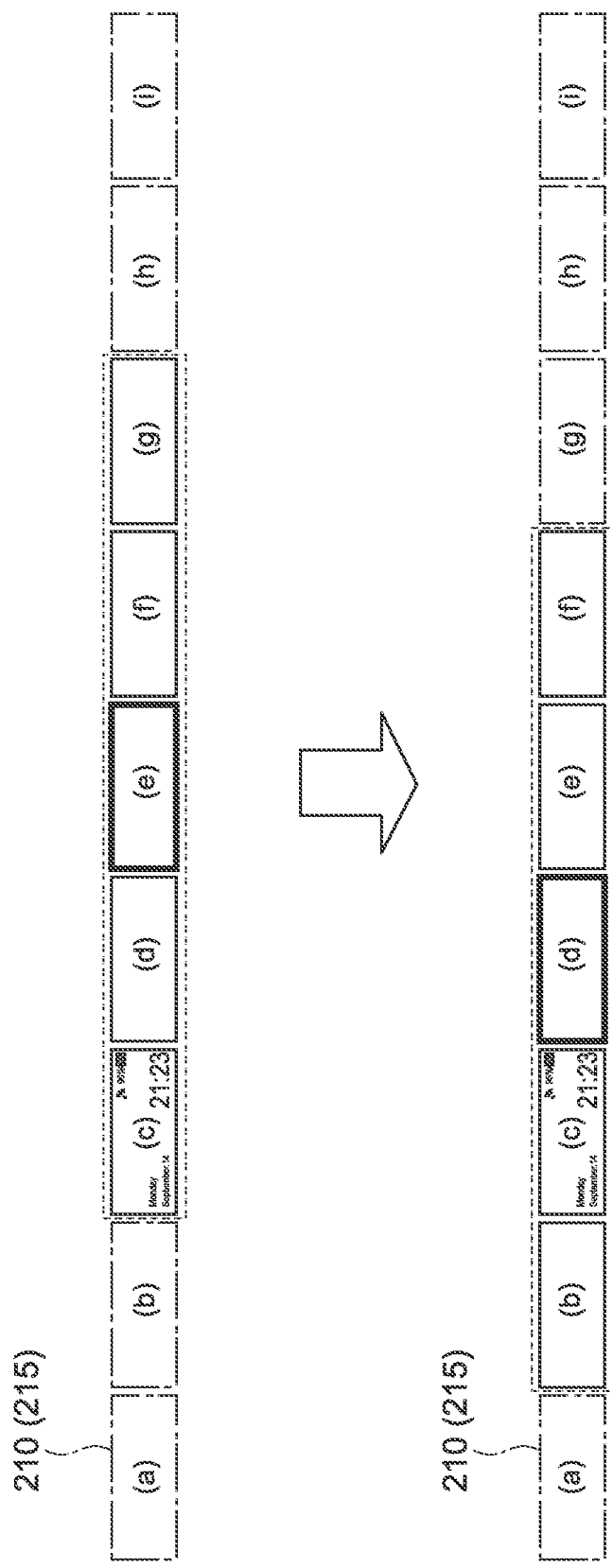
FIG. 5 illustrates an operation of switching card screens shown on the display.

FIG. 5 illustrates an operation of switching the card screens 210 within the card hierarchy 200. For example, suppose that the memory 32 of the mobile terminal 30 stores nine card images 215 (a) to (i), as shown in the upper part of FIG. 5. Then, suppose that the memory 52 of the control box 50 stores five card images 215 (c) to (g) (a part framed by the dotted line) out of these nine card images. The five card images 215 (c) to (g) are consecutive card images. At this moment, a card image 215 (e) indicated by the thick line frame is displayed on the display 71. Note that a card image 215 (c) is the card image of the home screen.

Suppose that, from the state as shown in the upper part of FIG. 5, a swiping operation to move the card screen 210 to the left has been input by the user. Then, as shown in the bottom part of FIG. 5, the firmware 45 switches the currently displayed card image 215 (e) to a card image 215 (d), and discards a card image 215 (g) that has been previously stored at an end (right-end) of the card images.

Further, when there is an input of the above-mentioned swiping operation, the firmware 45 notifies the mobile terminal 30 of the information of the operation being input. The companion app 25 extracts a newly placed card image 215 (b) at an end (left-end) of the card images, from the memory 32, and sends it to the control box 50. The firmware 45 receives it and stores it into the memory 52.

Thus, the firmware 45 maintains the state in which the predetermined number of card images 215 (five card images 215) is stored in the memory 52.

Such processing makes it possible to smoothly switch the card screens 210 while reducing the costs by reducing the necessary memory capacity in the control box 50, or by using small-capacity memory.

Note that the control box 50 may keeps the card image 215 of the home screen 211 and the card images 215 of the screens of default apps such as the camera app, and may not discard these images. In this case, the control box 50 may be configured to store the card images 215 other than those of the home screen 211 and the default apps, within the predetermined number of card images 215, in the memory 52.

(Operation of Camera)

Figure 6:
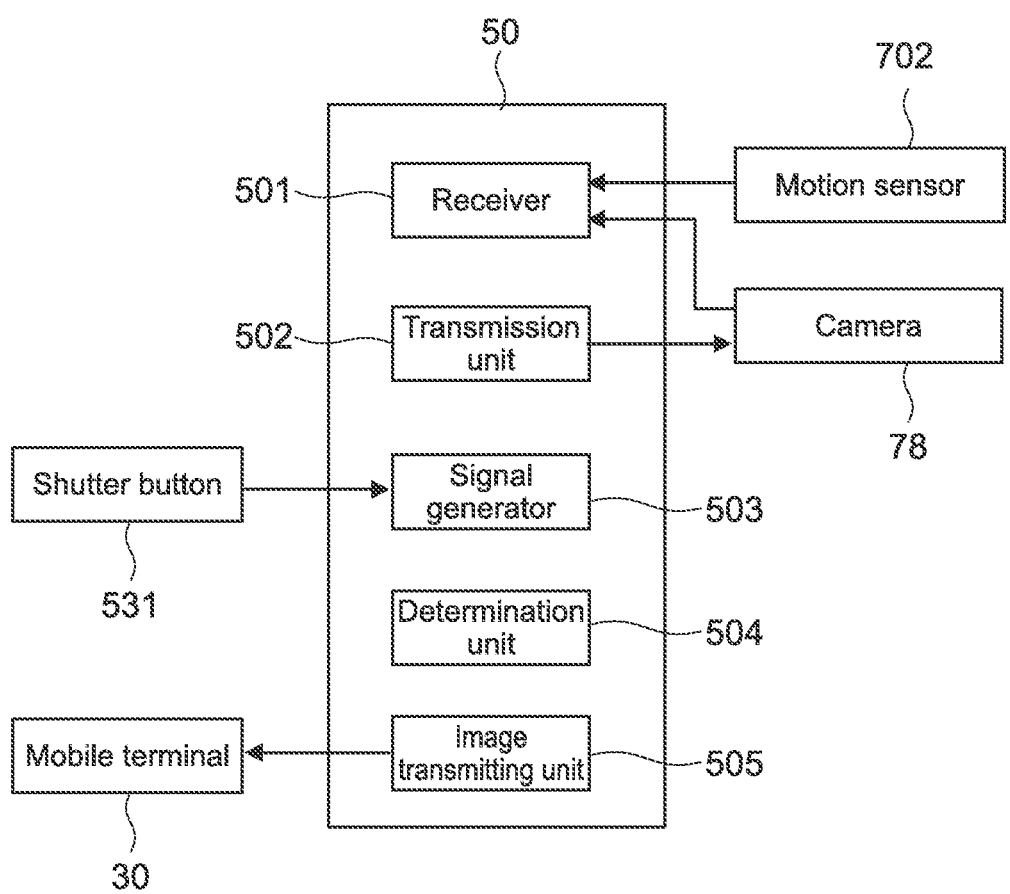
FIG. 6 is a functional block diagram of the control box.

The control box functions as a control unit to control an operation of the wearable device 70 when the camera app is started. FIG. 6 is a functional block diagram of the control box 50 when the camera app is started.

The control box 50 has a receiver 501, a transmission unit 502, a signal generator 503, a determination unit 504 and an image transmitting unit 505.

The receiver 501 is configured to be capable of receiving an output of a motion sensor 702 (the gyro sensor 73 and/or the acceleration sensor 74) installed in the wearable device 70. The receiver 501 is further configured to be capable of receiving an image photographed by the camera 78 mounted on the wearable device 70.

The transmission unit 502 is configured to be capable of sending an output of the determination unit 504 to the camera 78.

The signal generator 503 corresponds to a function of the CPU 51 or that of the firmware 45. The signal generator 503 detects an input operation of the shutter button 531 in the still image shooting mode and the video image shooting mode; and generates a starting signal for starting a camera 78 when it has received the input operation. The generated starting signal is then input to the determination unit 504.

Further, the signal generator 503 is configured to generate the starting signal for starting the camera 78, every time a predetermined time passes, in the interval shooting mode. The generated starting signal is input to the determination unit 504.

The determination unit 504 corresponds to a function of the CPU 51 or that of the firmware 45. The determination unit 504 controls the receiver 501, the transmission unit 502, the signal generator 503 and the image transmitting unit 505. The determination unit 504 also controls an operation of the camera app by executing the program stored in the memory 52.

The determination unit 504 is configured to determine whether or not the camera 78 (or the attachment unit 701, or, the wearable device) is in a predetermined resting state, based on the output of the motion sensor 702 that has been received by the receiver 501 or stored in the memory 502, and when the camera 78 is not in the predetermined resting state, limit a photographing operation of the camera 78.

The "predetermined resting state" includes not only the state where the camera 78 is standing still but also the state where the camera 78 is spatially moving in an extent that it does not affect photographing.

For example, if photographing by the camera 78 is performed in a state where the user's head is moving at a frequency of more than a predetermined level, such as when shaking the face (shaking the head), there may be a case where image blur occurs and the image becomes uncomfortable to look at. In such a state where the camera 78 is moving in an extent that it affects photographing, the control box 50 performs control of limiting the photographing operation of the camera 78. This makes it possible to inhibit photographing images insignificant for the user, and allow photographing only images significant for the user.

Examples of controlling to limit a photographing operation of the imaging unit" includes inhibiting acquisition of an image by the camera 78. Examples of controlling to inhibit acquisition of an image include controlling to invalidate the photographing operation (do not allow photographing); permit photographing but avoid regarding the image as valid (do not save); refrain from photographing until the camera 78 becomes in the predetermined resting state; and the like.

Typically, whether or not the camera 78 is in the predetermined resting state may be determined according to whether or not the output of the motion sensor 702, or the amount of change thereof, is not more than a predetermined threshold. The threshold may be a predetermined fixed value, or may be a variable value which can be adjusted by the user.

For example, in cases where an output of the gyro sensor 73 is used as the output of the motion sensor 702, the camera 78 is determined to be in the predetermined resting state when the output of the gyro sensor 73 is not more than the predetermined threshold. The predetermined threshold is not especially limited, and it can be appropriately set depending on desired quality of the image (image quality), purpose of the photographed image, or the like. For example, if it needs to be in a completely still state, the threshold value may be set to zero. However, since there is a possibility of missing a shutter chance if the threshold value is set too strictly, it is also possible to set a predetermined value that can include a little movement of the user's head in an allowable range, in an extent that it does not greatly affect photographing.

On the other hand, in cases where an output of the acceleration sensor 74 is used as the output of the motion sensor 702, the camera 78 is determined to be in the predetermined resting state when the output of the acceleration sensor 74 is not more than the predetermined threshold. Also in this case, the predetermined threshold is not especially limited, and it can be appropriately set depending on desired quality of the image (image quality), purpose of the photographed image, or the like, as described above.

Or, the output of the motion sensor 702 may also refer to each output of the gyro sensor 73 and the acceleration sensor 74. By referring to them, it is possible to determine with high precision whether or not the camera 78 is in the predetermined resting state.

In cases where the gyro sensor 73 and the acceleration sensor 74 are multiaxial sensors, it may refer to the output of the sensor with respect to each of the axes, or to the output of the sensor with respect to one of the axes. In the former case, the thresholds specific to the output of each axis or the threshold common to the output of these axes may be set, and it can also refer to an average value of the output of the sensor with respect to these axes.

Furthermore, in addition to the above, it is also possible to determine the resting state of the attachment unit 701 by performing arithmetic processing such as differentiating and integrating. The output of the gyro sensor 73 and that of the acceleration sensor 74 may be the output of the sensor itself, or may be an output value after passing an electronic component such as a filter.

The image transmitting unit 505 corresponds to a function of the local-area communication unit 54. The image transmitting unit 505 is configured to send an image photographed by the camera 78 to the mobile terminal 30 as the external apparatus. The mobile terminal 30 saves to the memory 32 the image that has been sent.

Figure 7:
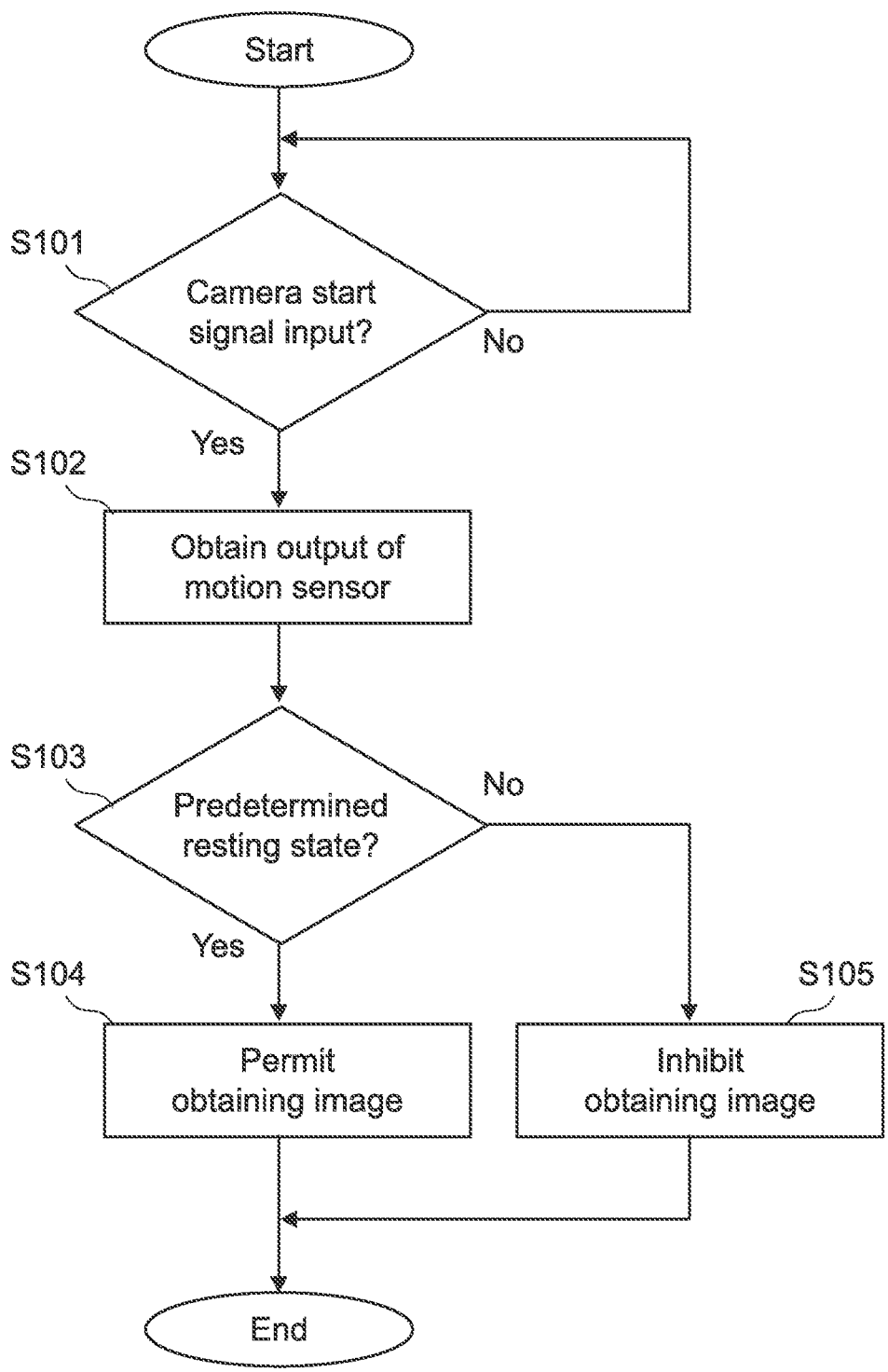
FIG. 7 is a flowchart showing an example of control by the control box.

FIG. 7 is a flowchart showing an example of control by the determination unit 504 in the still image shooting mode and the interval shooting mode.

The determination unit 504 determines whether or not a starting signal of the camera 78 is generated by the signal generating unit 503 (step S101). In the still image shooting mode, the starting signal is generated by the signal generating unit 503 upon receiving the input operation of the shutter button 531. In the interval shooting mode, the starting signal is generated by the signal generating unit 503 every time a predetermined time passes.

When the starting signal is generated, the determination unit 504 obtains an output of the motion sensor 702, and determines whether or not the camera 78 is in the predetermined resting state (steps S102 and S103).

When the determination unit 504 has determined that the camera 78 is in the predetermined resting state, it permits acquisition of a still image by the camera 78 (step S104). On the other hand, when the determination unit 504 has determined that the camera 78 is not in the predetermined resting state, it inhibits the acquisition of a still image by the camera 78 (step S105).

In the step (S104) of permitting the acquisition of an image, a photographing operation of the camera 78 is permitted, and the photographed image is obtained as a valid one. In this case, the photographed image may be saved in the memory 52 of the control box 50, or may be sent to the mobile terminal 30 and saved in its memory 32. By saving the photographed image in the mobile terminal 30, it makes it possible to reduce the capacity of the memory 52 of the control box 50.

On the other hand, in the step (S105) of inhibiting the acquisition of an image, a signal for inhibiting the photographing operation of the camera 78 until the camera 78 becomes in the predetermined resting state, or, a signal for repeating a predetermined photographing operation until it becomes in the predetermined resting state, is sent to the camera via the transmission unit 502.

The time to determine whether or not the attachment unit 701 is in the predetermined resting state is not especially limited, and it may be before photographing, during photographing, or after photographing. Hereinafter, typical examples of control will be described, by those of the still image shooting mode, and those of the interval shooting mode.

(Still Image Shooting Mode)

The "still image shooting mode" is a normal still image shooting mode in which the user operates the shutter button 531 and a still image is photographed by the camera 78. This mode is started by the user's operation of selecting the app screen 311 (see FIG. 4).

(Example of Control 1-1)

Figure 8:
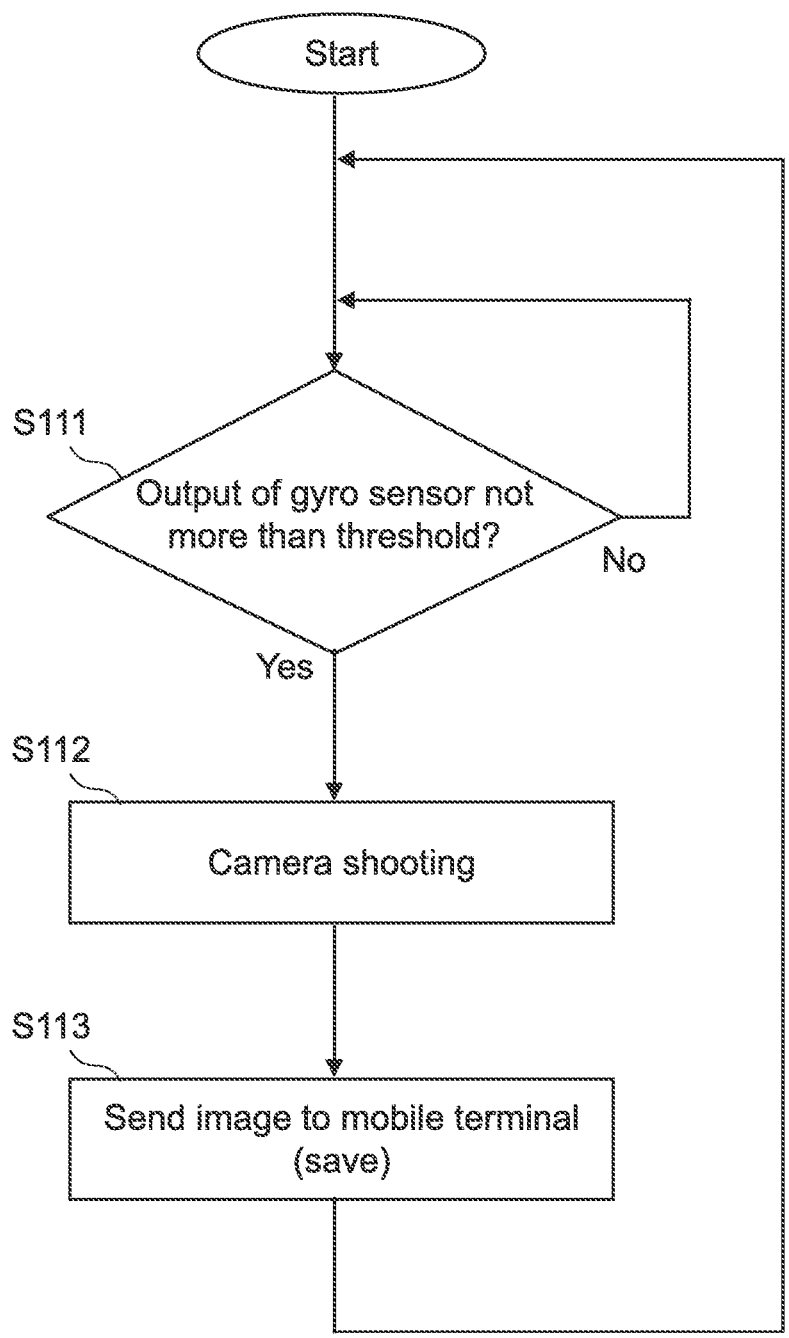
FIG. 8 is a control flow of the control box, describing a still image photographing operation using an angular velocity sensor.

FIG. 8 is a control flow of the control box 50, describing the photographing operation for taking a still image, based on the output of the gyro sensor 73 before photographing.

In this example of the control, the determination unit 504 determines whether or not the camera 78 is in the predetermined resting state, after it has detected the input of the shutter button 531 and before the photographing operation of the camera 78 is performed.

As shown in FIG. 8, the determination unit 504, upon receiving the starting signal generated by the signal generator 503, determines whether or not the output of the gyro sensor 73 is not more than a predetermined threshold (for example, zero) (step S111). The threshold is an absolute value (the same shall apply hereinafter). When the determination unit 504 has determined that the output of the gyro sensor 73 is not more than the threshold, it allows the camera 78 to perform the photographing operation (step S112). Then, the determination unit 504 receives the image photographed by the camera 78, and sends it to the mobile terminal 30 to save (obtain) the received image (step S113).

In this example of control, in cases where the camera 78 is not in the predetermined resting state immediately before photographing, the photographing operation by the camera 78 would be inhibited until the camera 78 becomes in the predetermined resting state. This makes it possible to inhibit obtaining an image with a large blur which the user might not need, and allow photographing only images significant for the user.

Incidentally, when the number of times of determination of the resting state reaches a predetermined number, display controlling to give a notice to the user to stop moving may be performed using the display 71.

(Example of Control 1-2)

Figure 9:
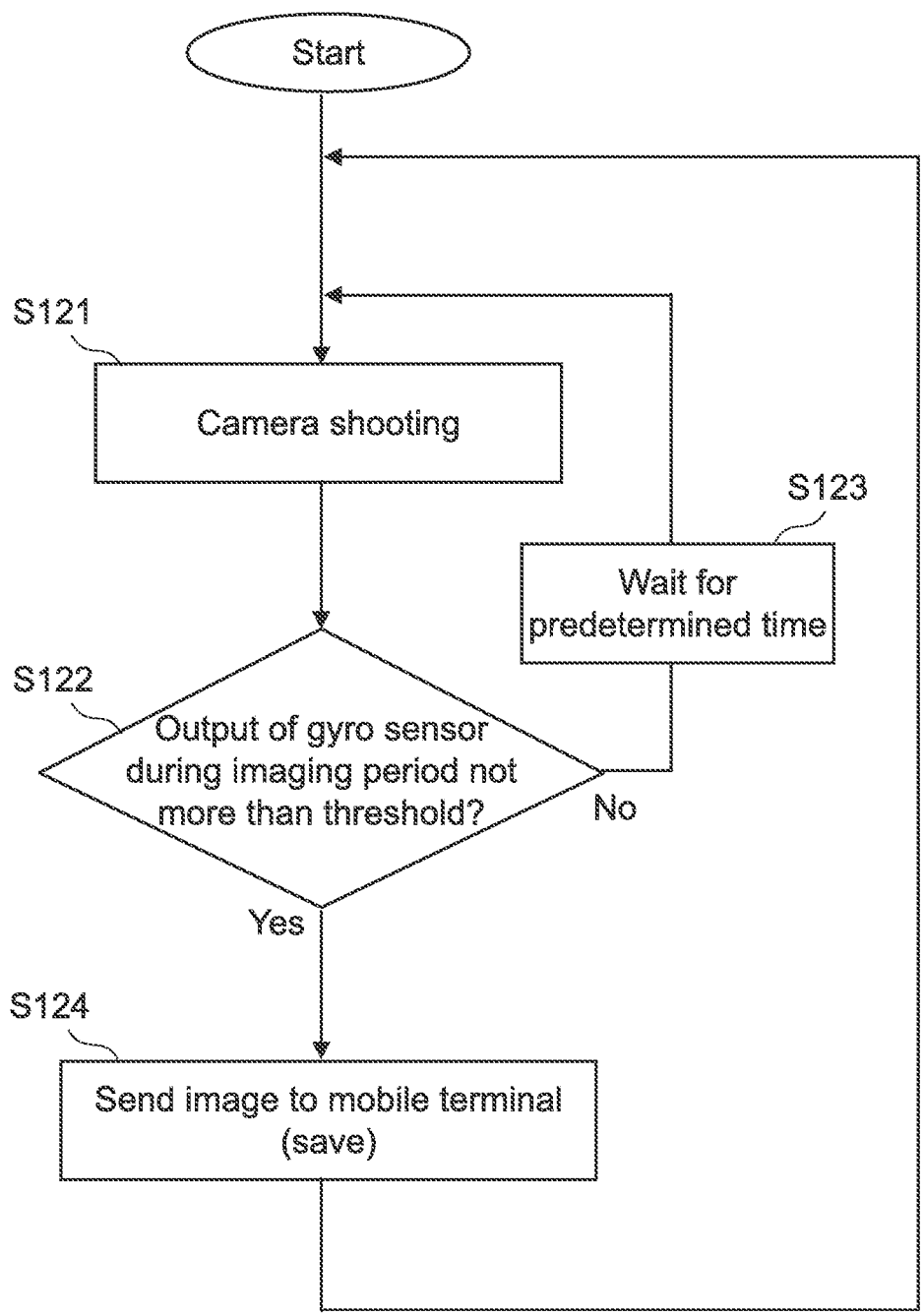
FIG. 9 is a control flow of the control box, describing a still image photographing operation using the angular velocity sensor.

FIG. 9 is a control flow of the control box 50, describing the photographing operation for taking a still image, based on the output of the gyro sensor 73 during photographing.

In this example of the control, the determination unit 504 determines whether or not the camera 78 is in the predetermined resting state, after the photographing operation of the camera 78 is performed. Specifically, in this example, the determination unit 504 determines the predetermined resting state, according to whether or not the camera 78 has been in the predetermined resting state during an exposure period of the camera 78.

As shown in FIG. 9, the determination unit 504, upon receiving the starting signal for the camera 78, allows the camera 78 to perform the photographing operation (step S121). Subsequently, the determination unit 504 determines whether the output of the gyro sensor 73 during an imaging period (exposure period) after shooting has been not more than the predetermined threshold (for example, zero) (step S122). If the output of the gyro sensor 73 has been more than the threshold, then, after waiting for a predetermined time (for example, 500 msec), starts the camera 78 and allows it to perform the photographing operation again (steps S123 and S121). The determination unit 504 repeats the above-described operation until the output of the gyro sensor 73 becomes not more than the threshold. Then, when it determines that the output of the gyro sensor 73 is not more than the threshold, the determination unit 504 receives the image photographed by the camera 78, and sends it to the mobile terminal 30 to save (obtain) the received image (step S124).

In this example of control, in cases where the camera 78 is not in the predetermined resting state during photographing, the executed photographing operation by the camera 78 would be invalidated, and after a predetermined time has passed, it would be determined again whether or not it is in the predetermined resting state. This makes it possible to inhibit obtaining an image with a large blur which the user might not need, and allow photographing only images significant for the user. Furthermore, as it determines the resting state of the camera 78 during the imaging period, it is able to increase the precision of determination.

(Example of Control 1-3)

Figure 10:
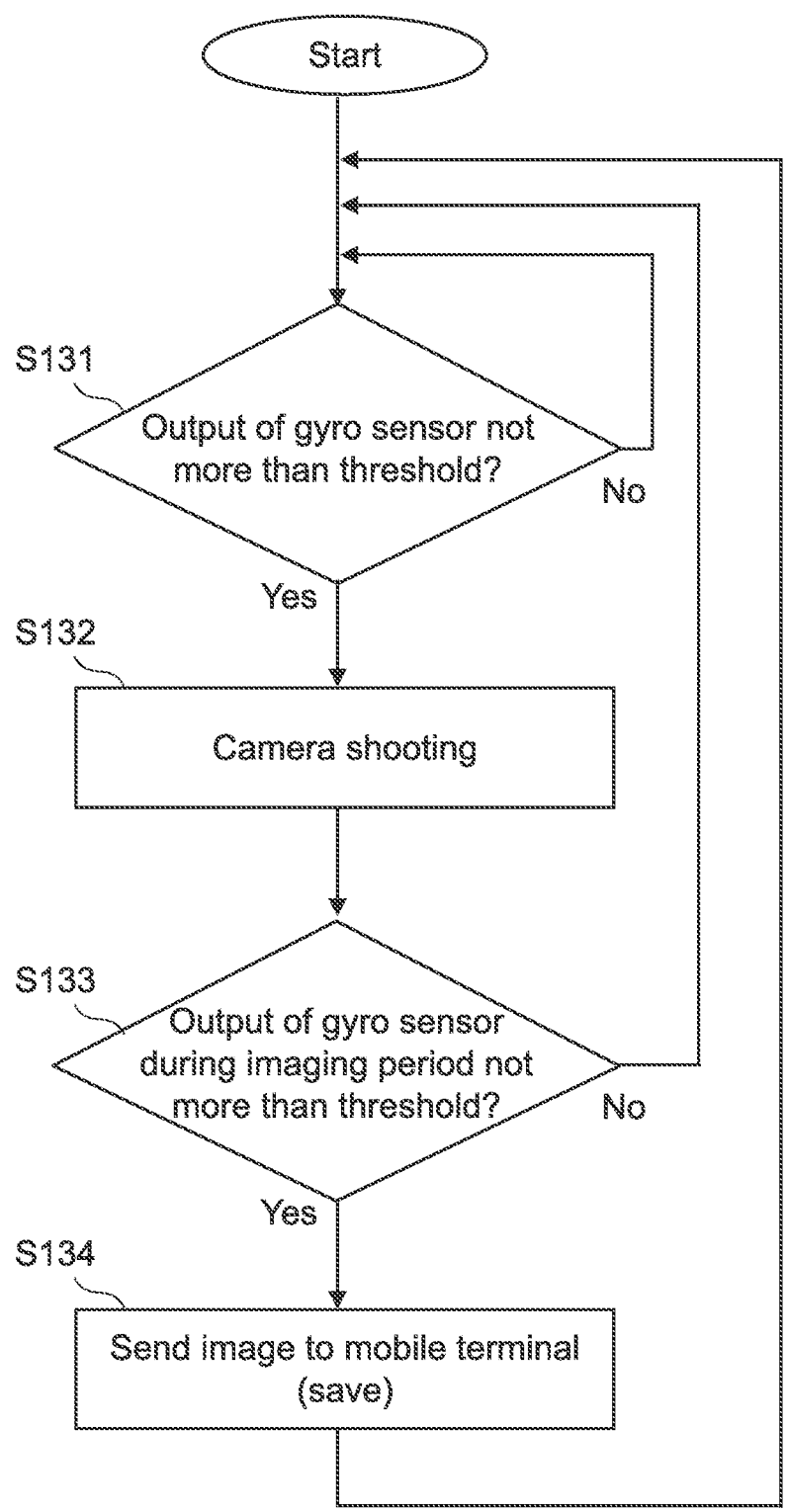
FIG. 10 is a control flow of the control box, describing a still image photographing operation using the angular velocity sensor.

FIG. 10 is a control flow of the control box 50, describing the photographing operation for taking a still image, based on the output of the gyro sensor 73 before photographing and during photographing. This example of the control is substantially a combination of the above-described "(Example of control 1-1)" and "(Example of control 1-2)".

As shown in FIG. 10, the determination unit 504, upon receiving the starting signal for the camera 78, determines whether or not the output of the gyro sensor 73 is not more than a predetermined threshold (for example, zero) (step S131). When the determination unit 504 has determined that the output of the gyro sensor 73 is not more than the predetermined threshold, it allows the camera 78 to perform the photographing operation (step S132).

Subsequently, the determination unit 504 determines whether the output of the gyro sensor 73 during the imaging period (exposure period) after shooting has been not more than the threshold (step S133). If the output of the gyro sensor 73 has been more than the threshold, then, the determination unit 504 waits until the output of the gyro sensor 73 becomes not more than the threshold; and after the output has become not more than the threshold, it allows the camera 78 to perform the photographing operation again (steps S131 and S132). The determination unit 504 repeats the above-described operation until the output of the gyro sensor 73 becomes not more than the threshold.

Then, when it determines that the output of the gyro sensor 73 during the imaging period has been not more than the threshold, the determination unit 504 receives the image photographed by the camera 78, and sends it to the mobile terminal 30 to save (obtain) the received image (step S134).

In this example of control, in cases where the camera 78 is not in the predetermined resting state immediately before photographing and during photographing, the photographing operation by the camera 78 would be repeated until it is determined that the camera has been in the predetermined resting state during photographing. This makes it possible to inhibit obtaining an image with a large blur which the user might not need, and allow photographing only images significant for the user. Furthermore, as it determines the resting state of the camera 78 during the imaging period, it is able to increase the precision of determination.

(Interval Shooting Mode)

In the interval shooting mode, the control box 50 allows the camera 78 to perform the photographing operation at a predetermined timing regardless of absence of any input operation by the user. The interval shooting mode is a shooting mode in which a still image of a subject in the eyesight direction is photographed automatically and periodically, without the user's operation on the shutter button 531. This mode is started by the user's operation of selecting the app screen 312 (see FIG. 4). In this shooting mode, the wearable device 70 and the control box 50 is configured to serve as an automatic imaging apparatus which may be used in a life-log camera or the like.

(Example of Control 1-4)

Figure 11:
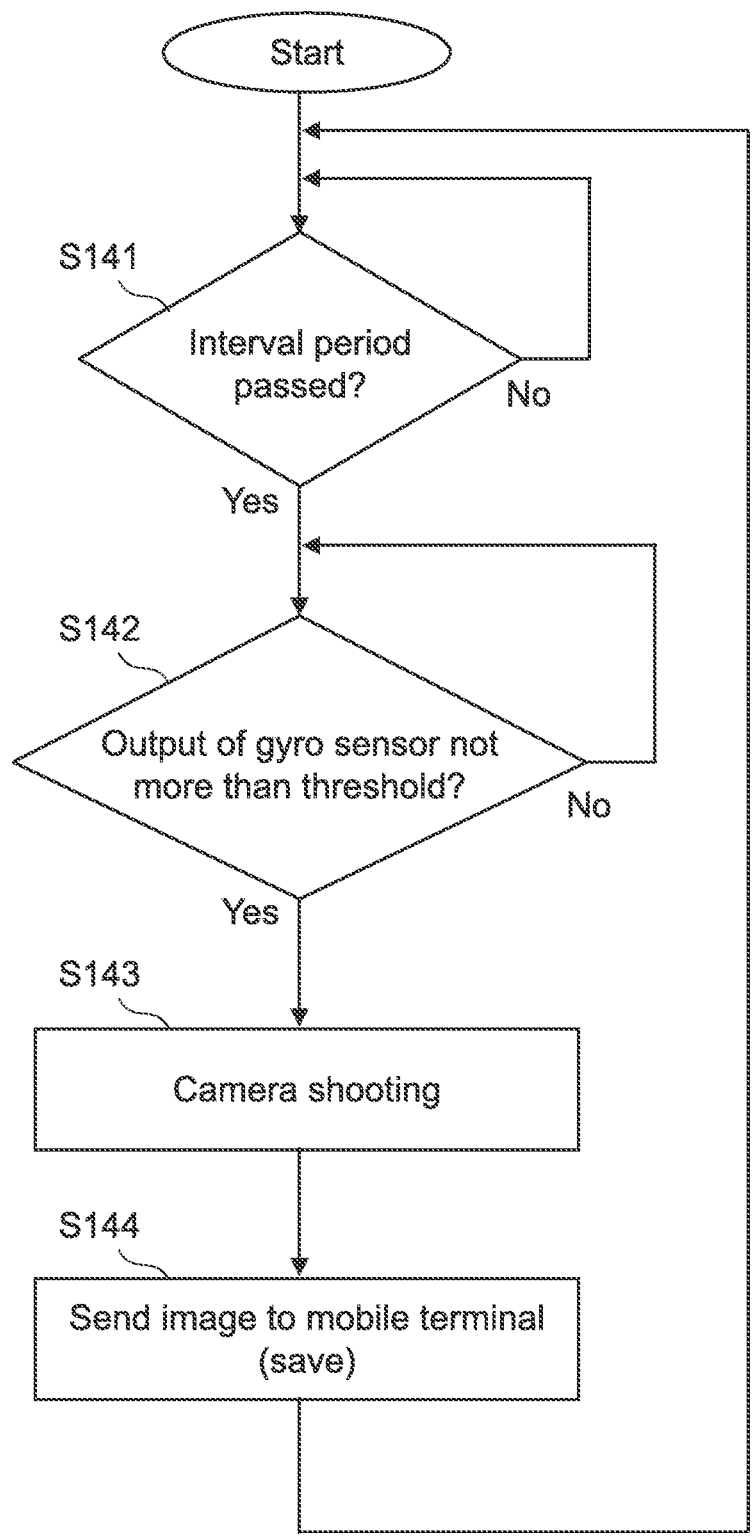
FIG. 11 is a control flow of the control box, describing an interval photographing operation using the angular velocity sensor.

FIG. 11 is a control flow of the control box 50, describing the interval photographing operation for taking a still image, based on the output of the gyro sensor 73 before photographing.

In this example of the control, the determination unit 504 determines whether or not the camera 78 is in the predetermined resting state, after a starting signal for the camera 78 has been generated by an elapse of a predetermined interval time, and before the photographing operation of the camera 78 is performed.

As shown in FIG. 11, the determination unit 504, when the interval time has passed, determines whether or not the output of the gyro sensor 73 is not more than a predetermined threshold (for example, zero) (steps S141 and S142). When the determination unit 504 has determined that the output of the gyro sensor 73 is not more than the threshold, it allows the camera 78 to perform the photographing operation (step S143). Then, the determination unit 504 receives the image photographed by the camera 78, and sends it to the mobile terminal 30 to save (obtain) the received image (step S144).

In this example of control, in cases where the camera 78 is not in the predetermined resting state immediately before photographing, the photographing operation by the camera 78 would be inhibited until the camera 78 becomes in the predetermined resting state. This makes it possible to inhibit obtaining an image with a large blur which the user might not need, and allow photographing only images significant for the user.

The interval time may be set by the user by units of, for example, seconds, minutes, or hours. The starting signal may be generated by the signal generator 503 every time the set interval time passes after the starting of the interval shooting mode, for example. Alternatively, it is also possible that timing of the interval time may start from the previous time of photographing or from the time of acquisition of the last photographed image.

Typically, the starting signal may be generated by the signal processor 503 at a set time interval. However, since the photographing operation would be limited until the camera 78 becomes in the predetermined resting state, if the camera 78 is not in the predetermined resting state; there may be some cases where the interval in photographing may be different from the set interval of time. In order to solve this problem, it may also be configured to display a notice on the display 71 of the wearable device 70 to remind the user, the notice being an advance notice of photographing, from a predetermined time before the starting signal is generated. The advance notice of photographing may be, for example, a count-down until photographing.

(Example of Control 1-5)

Figure 12:
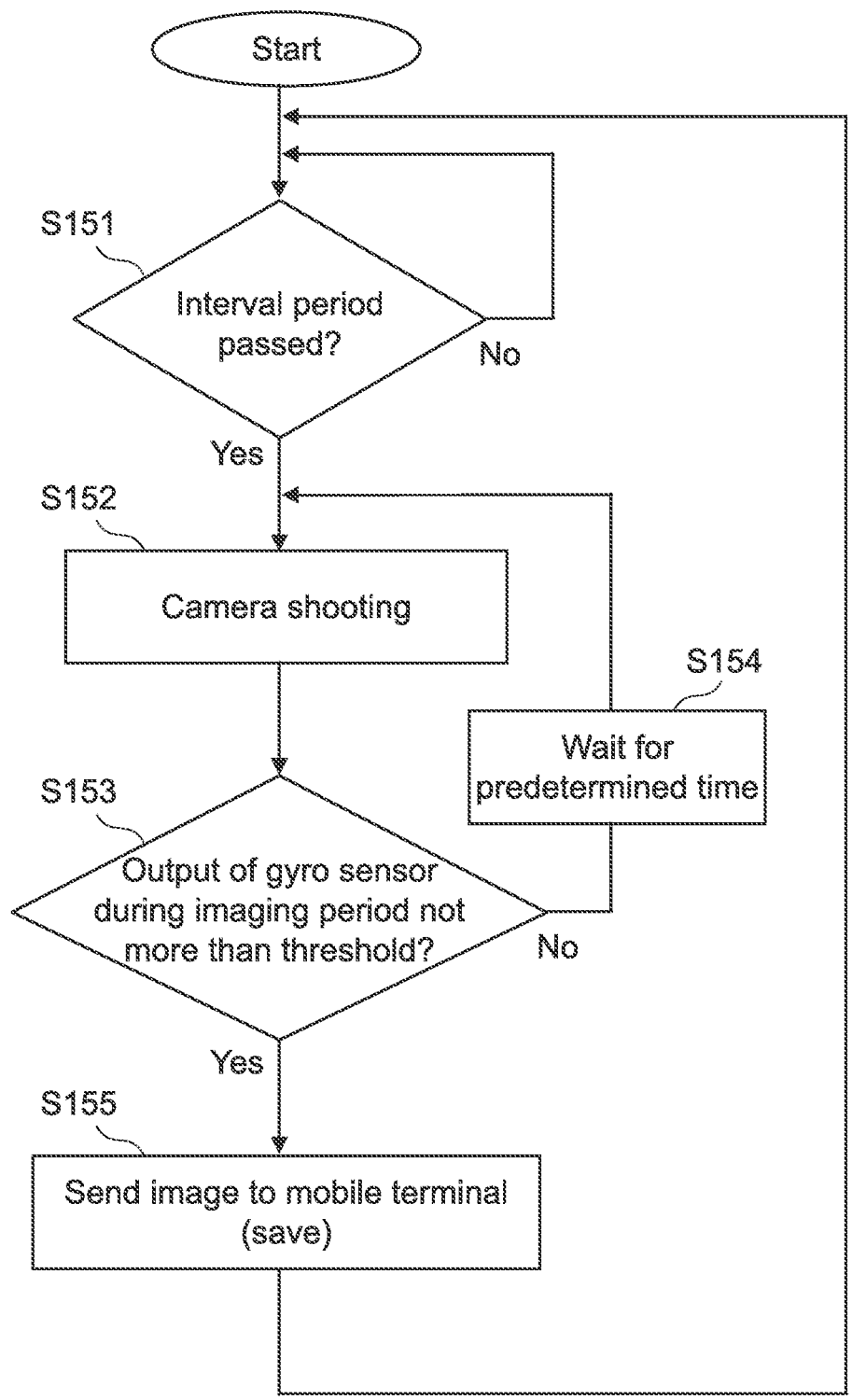
FIG. 12 is a control flow of the control box, describing an interval photographing operation using the angular velocity sensor.

FIG. 12 is a control flow of the control box 50, describing the interval photographing operation for taking a still image, based on the output of the gyro sensor 73 during photographing.

In this example of the control, the determination unit 504 determines whether or not the camera 78 is in the predetermined resting state, after the photographing operation of the camera 78 is performed. Specifically, in this example, the determination unit 504 determines the predetermined resting state, according to whether or not the camera 78 has been in the predetermined resting state during an exposure period of the camera 78.

As shown in FIG. 12, the determination unit 504, when the interval time has passed, allows the camera 78 to perform the photographing operation (steps S151 and S152). Subsequently, the determination unit 504 determines whether the output of the gyro sensor 73 during the imaging period (exposure period) after shooting has been not more than the predetermined threshold (for example, zero) (step S153). If the output of the gyro sensor 73 has been more than the threshold, then, after waiting for a predetermined time (for example, 500 msec), allows the camera 78 to perform the photographing operation again (steps S154 and S155). The determination unit 504 repeats the above-described operation until the output of the gyro sensor 73 becomes not more than the threshold. Then, when it determines that the output of the gyro sensor 73 is not more than the threshold, the determination unit 504 receives the image photographed by the camera 78, and sends it to the mobile terminal 30 to save (obtain) the received image (step S155).

In this example of control, in cases where the camera 78 is not in the predetermined resting state during photographing, the photographing operation by the camera 78 would be invalidated until the camera 78 becomes in the predetermined resting state. This makes it possible to inhibit obtaining an image with a large blur which the user might not need, and allow photographing only images significant for the user. Furthermore, as it determines the resting state of the attachment unit 701 during the imaging period, it is able to increase the precision of determination.

(Example of Control 1-6)

Figure 13:
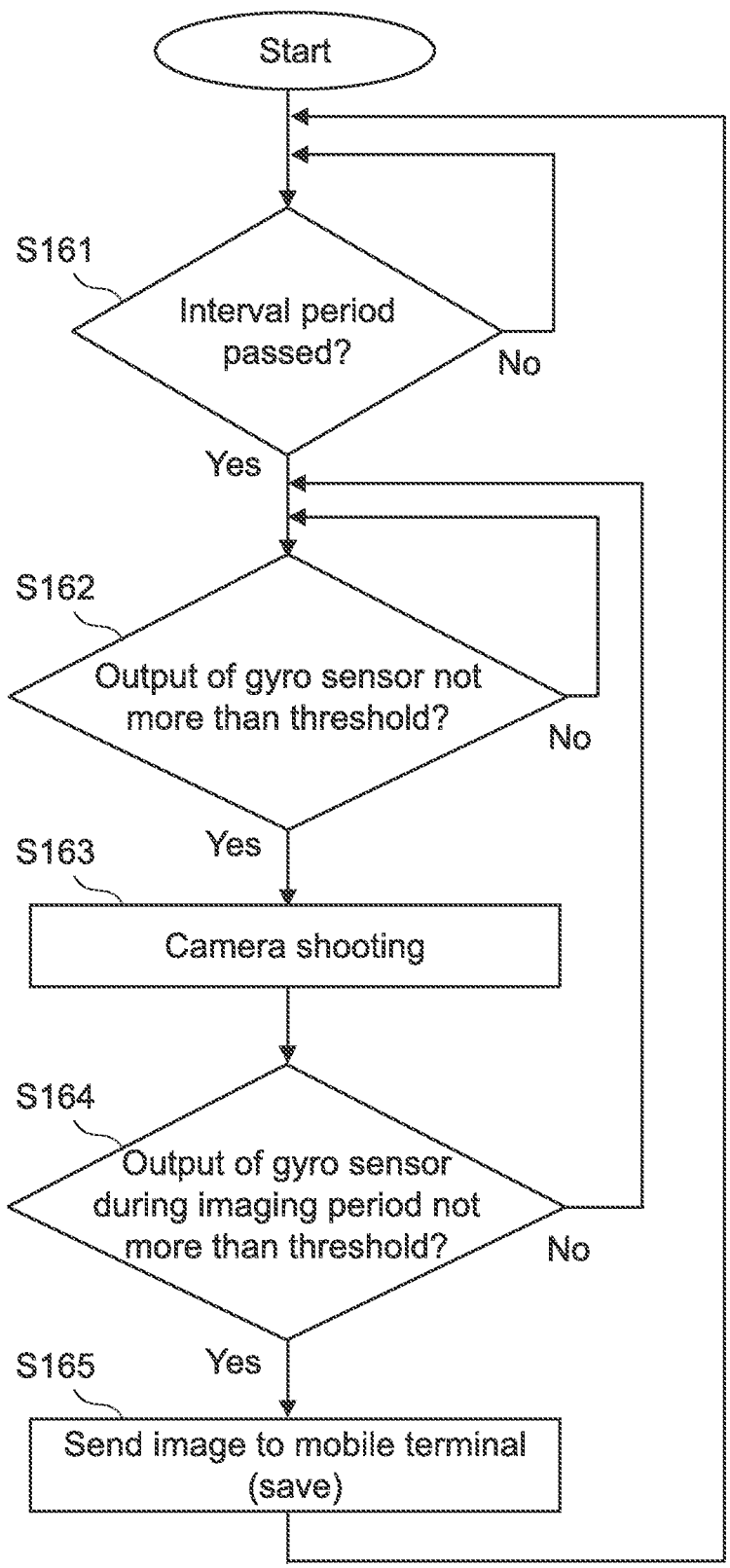
FIG. 13 is a control flow of the control box, describing an interval photographing operation using the angular velocity sensor.

FIG. 13 is a control flow of the control box 50, describing the interval photographing operation for taking a still image, based on the output of the gyro sensor 73 before photographing and during photographing. This example of the control is substantially a combination of the above-described "(Example of control 1-4)" and "(Example of control 1-5)".

As shown in FIG. 13, the determination unit 504, when the interval time has passed, determines whether or not the output of the gyro sensor 73 is not more than a predetermined threshold (for example, zero) (steps S161 and S162). When the determination unit 504 has determined that the output of the gyro sensor 73 is not more than the predetermined threshold, it allows the camera 78 to perform the photographing operation (step S163).

Subsequently, the determination unit 504 determines whether the output of the gyro sensor 73 during the imaging period (exposure period) after shooting has been not more than the threshold (step S164). If the output of the gyro sensor 73 has been more than the threshold, then, the determination unit 504 waits until the output of the gyro sensor 73 becomes not more than the threshold; and after the output has become not more than the threshold, it allows the camera 78 to perform the photographing operation again (steps S162 and S163). The determination unit 504 repeats the above-described operation until the output of the gyro sensor 73 becomes not more than the threshold.

Then, when it determines that the output of the gyro sensor 73 during the imaging period has been not more than the threshold, the determination unit 504 receives the image photographed by the camera 78, and sends it to the mobile terminal 30 to save (obtain) the received image (step S165).

In this example of control, in cases where the camera 78 is not in the predetermined resting state immediately before photographing and during photographing, the photographing operation by the camera 78 would be repeated until it is determined that the camera has been in the predetermined resting state during photographing. This makes it possible to inhibit obtaining an image with a large blur which the user might not need, and allow photographing only images significant for the user. Furthermore, as it determines the resting state of the attachment unit 701 during the imaging period, it is able to increase the precision of determination.

Second Embodiment

In the embodiment above, in camera shooting modes, the output of the gyro sensor 73 has been used for the determination of whether or not the camera 78 is in the predetermined resting state. In this embodiment, an output of the acceleration sensor 74 will be used.

(Still Image Shooting Mode)

(Example of Control 2-1)

Figure 14:
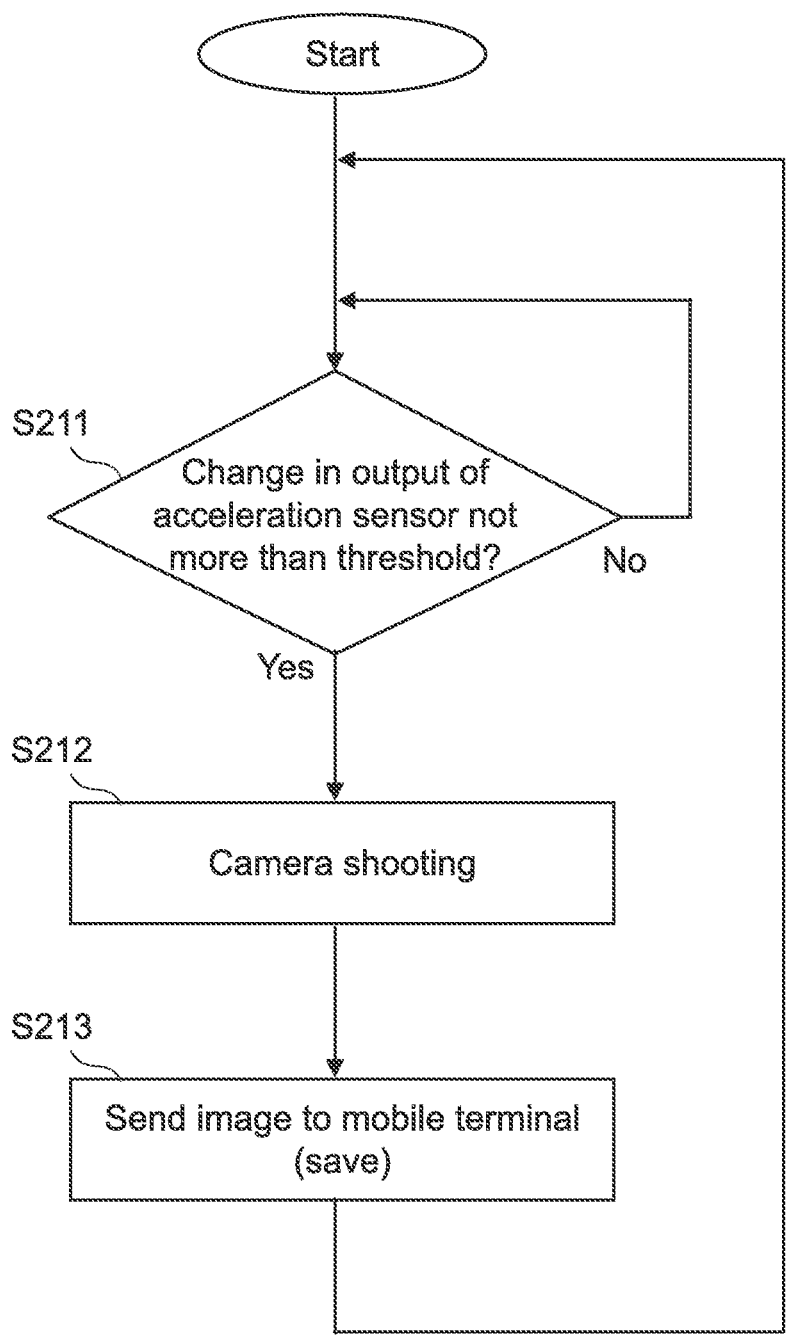
FIG. 14 is a control flow of the control box, describing a still image photographing operation using an acceleration sensor.

FIG. 14 is a control flow of the control box 50, describing the photographing operation for taking a still image, based on the output of the acceleration sensor 74 before photographing.

As shown in FIG. 14, the determination unit 504, upon receiving the starting signal generated by the signal generator 503, determines whether or not a change in the output of the acceleration sensor 74 is not more than a predetermined threshold (for example, plus or minus 0.1 G/sec) (step S211). The threshold is an absolute value (the same shall apply hereinafter). When the determination unit 504 has determined that the change in the output of the acceleration sensor 74 is not more than the threshold, it allows the camera 78 to perform the photographing operation (step S212). Then, the determination unit 504 receives the image photographed by the camera 78, and sends it to the mobile terminal 30 to save (obtain) the received image (step S213).

With this example of control, it makes it possible to obtain substantially the same effect as the above-described "(Example of control 1-1)".

(Example of Control 2-2)

Figure 15:
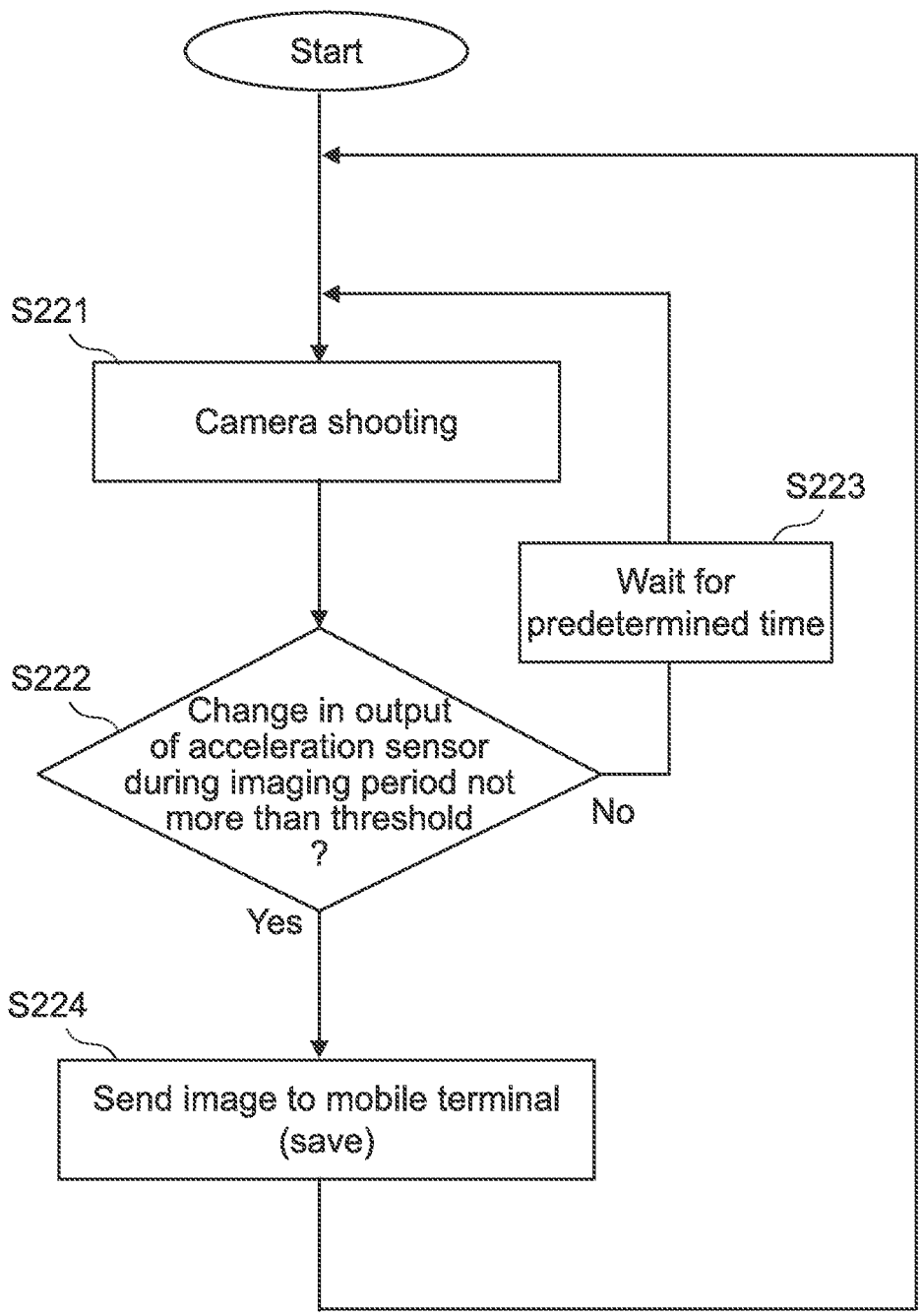
FIG. 15 is a control flow of the control box, describing a still image photographing operation using the acceleration sensor.

FIG. 15 is a control flow of the control box 50, describing the photographing operation for taking a still image, based on the output of the acceleration sensor 74 during photographing.

As shown in FIG. 15, the determination unit 504, upon receiving the starting signal for the camera 78, allows the camera 78 to perform the photographing operation (step S221). Subsequently, the determination unit 504 determines whether the change in the output of the acceleration sensor 74 during the imaging period (exposure period) after shooting has been not more than the predetermined threshold (for example, plus or minus 0.1 G) (step S222). If the change in the output of the acceleration sensor 74 has been more than the threshold, then, after waiting for a predetermined time (for example, 500 msec), allows the camera 78 to perform the photographing operation again (steps S223 and S221). The determination unit 504 repeats the above-described operation until the change in the output of the acceleration sensor 74 becomes not more than the threshold. Then, when it determines that the change in the output of the acceleration sensor 74 is not more than the threshold, the determination unit 504 receives the image photographed by the camera 78, and sends it to the mobile terminal 30 to save (obtain) the received image (step S224).

With this example of control, it makes it possible to obtain substantially the same effect as the above-described "(Example of control 1-2)".

(Example of Control 2-3)

Figure 16:
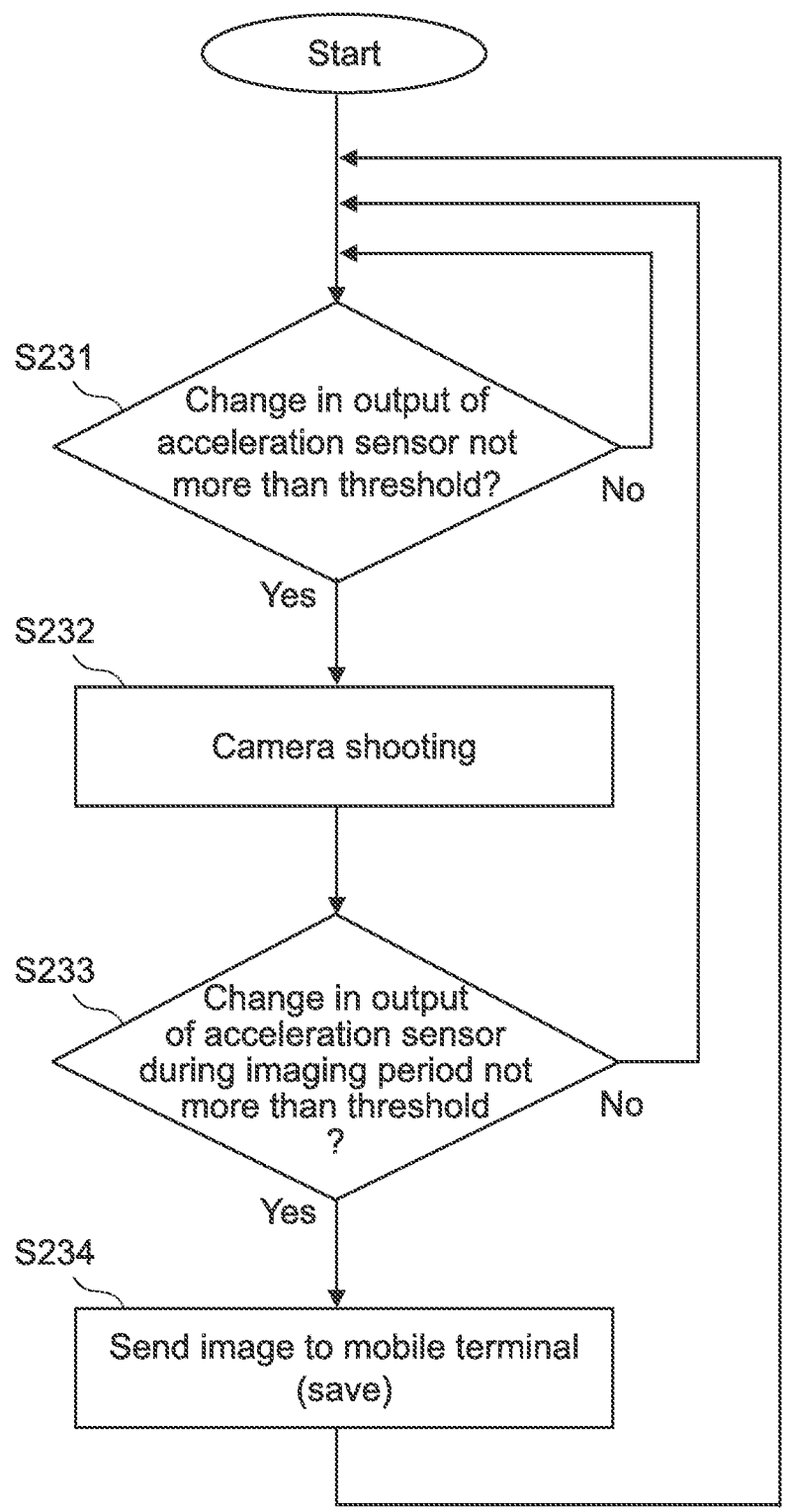
FIG. 16 is a control flow of the control box, describing a still image photographing operation using the acceleration sensor.

FIG. 16 is a control flow of the control box 50, describing the photographing operation for taking a still image, based on the output of the acceleration sensor 74 before photographing and during photographing. This example of the control is substantially a combination of the above-described "(Example of control 2-1)" and "(Example of control 2-2)".

As shown in FIG. 16, the determination unit 504, upon receiving the starting signal for the camera 78, determines whether or not the change in the output of the acceleration sensor 74 is not more than a predetermined threshold (for example, plus or minus 0.1 G) (step S231). When the determination unit 504 has determined that the change in the output of the acceleration sensor 74 is not more than the predetermined threshold, it allows the camera 78 to perform the photographing operation (step S232).

Subsequently, the determination unit 504 determines whether the change in the output of the acceleration sensor 74 during the imaging period (exposure period) after shooting has been not more than the threshold (step S233). If the change in the output of the acceleration sensor 74 has been more than the threshold, then, the determination unit 504 waits until the change in the output of the acceleration sensor 74 becomes not more than the threshold; and after the change in the output has become not more than the threshold, it allows the camera 78 to perform the photographing operation again (steps S231 and S232). The determination unit 504 repeats the above-described operation until the change in the output of the acceleration sensor 74 becomes not more than the threshold.

Then, when it determines that the change in the output of the acceleration sensor 74 during the imaging period has been not more than the threshold, the determination unit 504 receives the image photographed by the camera 78, and sends it to the mobile terminal 30 to save (obtain) the received image (step S234).

With this example of control, it makes it possible to obtain substantially the same effect as the above-described "(Example of control 1-3)".

(Interval Shooting Mode)
(Example of Control 2-4)

Figure 17:
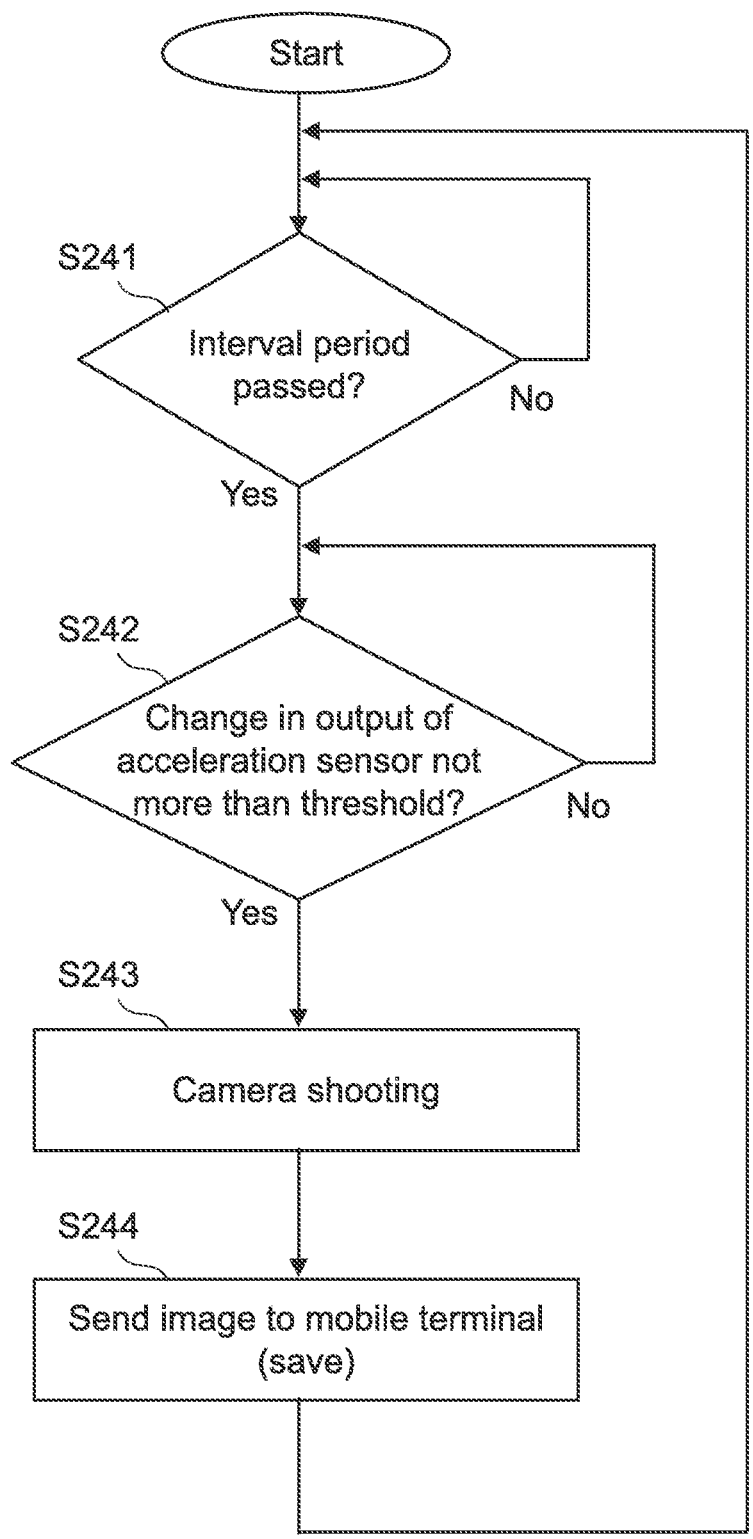
FIG. 17 is a control flow of the control box, describing an interval photographing operation using the acceleration sensor.

FIG. 17 is a control flow of the control box 50, describing the interval photographing operation for taking a still image, based on the output of the acceleration sensor 74 before photographing.

As shown in FIG. 17, the determination unit 504, when the interval time has passed, determines whether or not the change in the output of the acceleration sensor 74 is not more than a predetermined threshold (for example, plus or minus 0.1 G) (steps S241 and S242). When the determination unit 504 has determined that the change in the output of the acceleration sensor 74 is not more than the threshold, it allows the camera 78 to perform the photographing operation (step S243). Then, the determination unit 504 receives the image photographed by the camera 78, and sends it to the mobile terminal 30 to save (obtain) the received image (step S244).

With this example of control, it makes it possible to obtain substantially the same effect as the above-described "(Example of control 1-4)".

(Example of Control 2-5)

Figure 18:
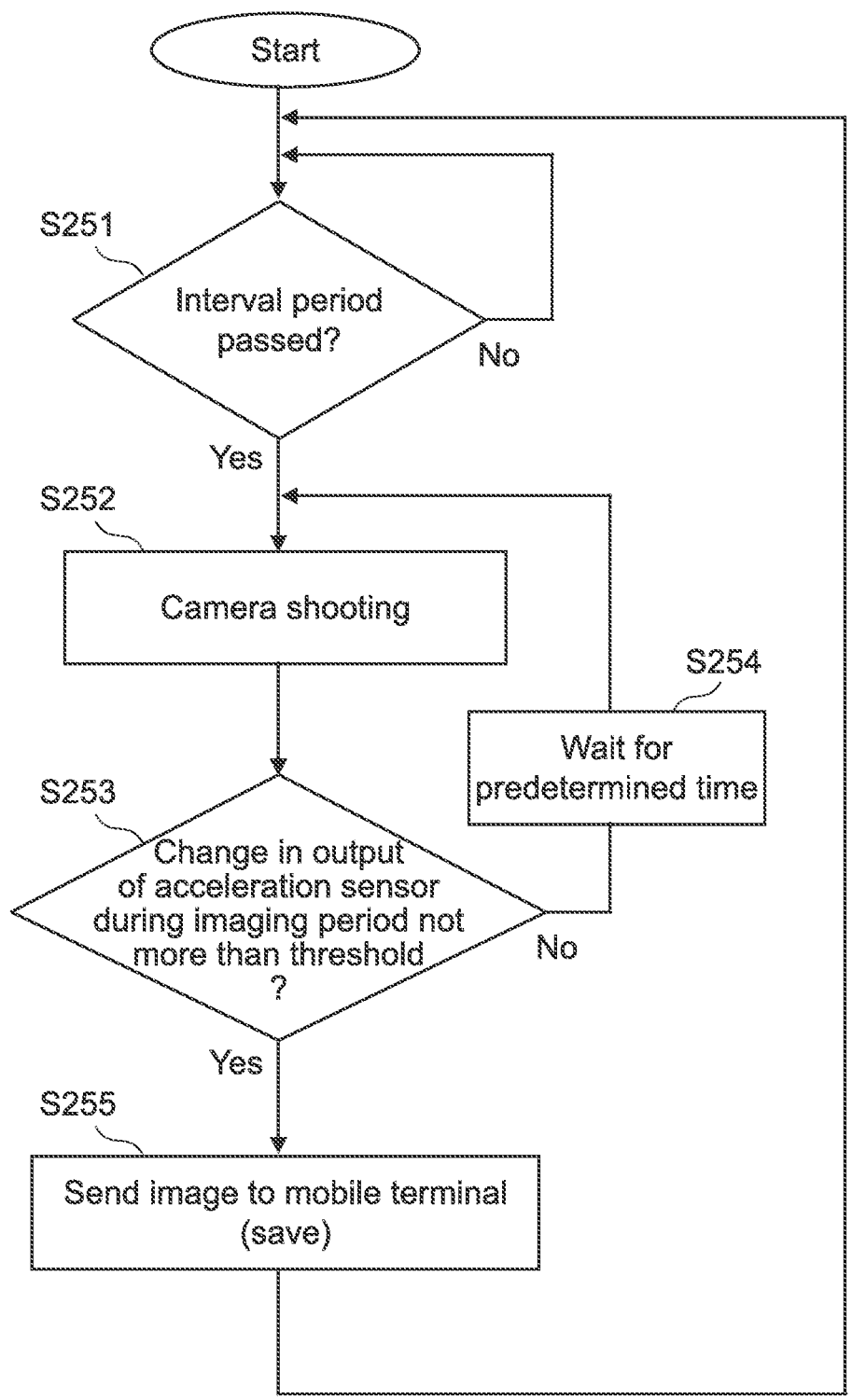
FIG. 18 is a control flow of the control box, describing an interval photographing operation using the acceleration sensor.

FIG. 18 is a control flow of the control box 50, describing the interval photographing operation for taking a still image, based on the output of the acceleration sensor 74 during photographing.

As shown in FIG. 18, the determination unit 504, when the interval time has passed, allows the camera 78 to perform the photographing operation (steps S251 and S252). Subsequently, the determination unit 504 determines whether the change in the output of the acceleration sensor 74 during the imaging period (exposure period) after shooting has been not more than the predetermined threshold (for example, plus or minus 0.1 G) (step S253). If the change in the output of the acceleration sensor 74 has been more than the threshold, then, after waiting for a predetermined time (for example, 500 msec), allows the camera 78 to perform the photographing operation again (steps S254 and S255). The determination unit 504 repeats the above-described operation until the change in the output of the acceleration sensor 74 becomes not more than the threshold. Then, when it determines that the change in the output of the acceleration sensor 74 is not more than the threshold, the determination unit 504 receives the image photographed by the camera 78, and sends it to the mobile terminal 30 to save (obtain) the received image (step S255).

With this example of control, it makes it possible to obtain substantially the same effect as the above-described "(Example of control 1-5)".

(Example of Control 2-6)

Figure 19:
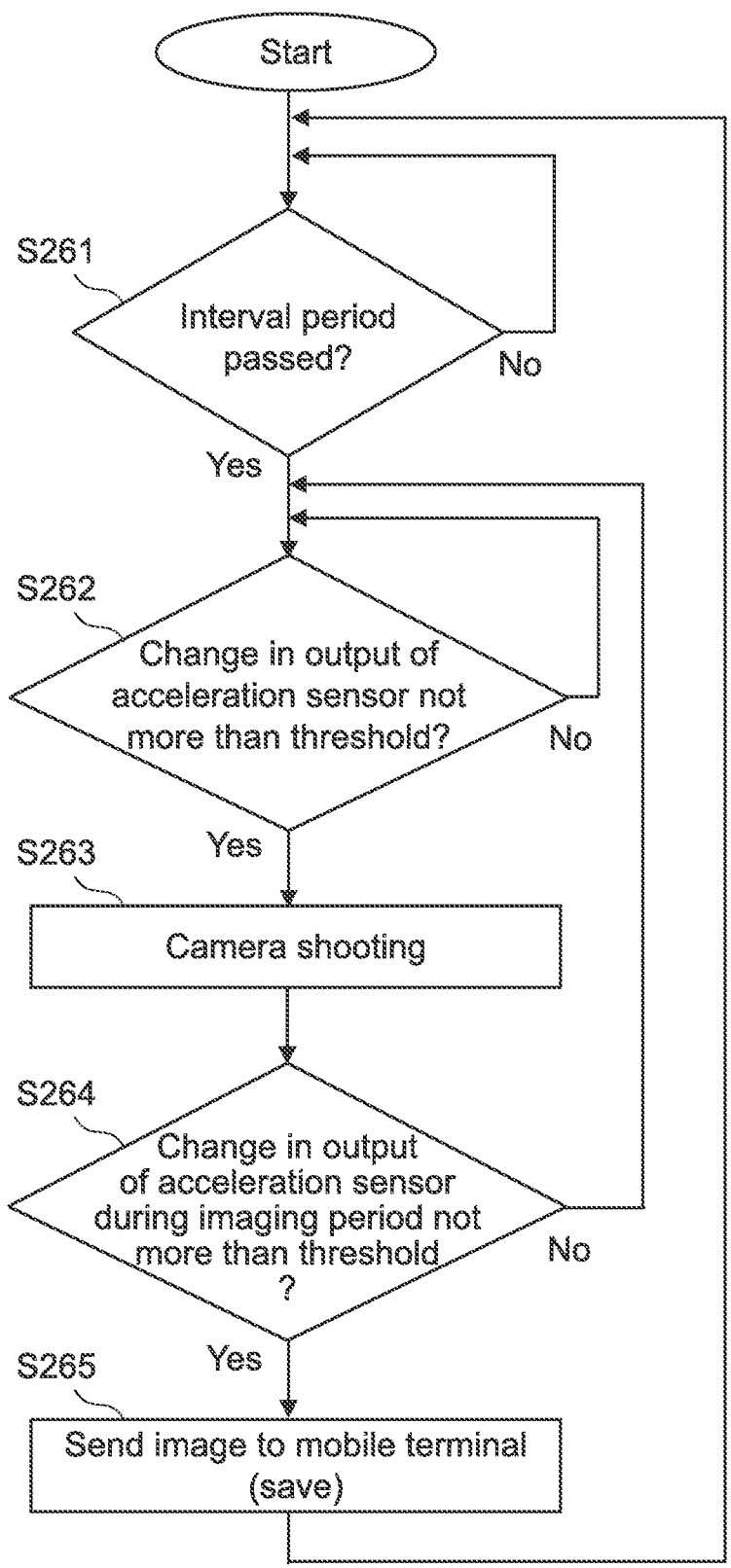
FIG. 19 is a control flow of the control box, describing an interval photographing operation using the acceleration sensor.

FIG. 19 is a control flow of the control box 50, describing the interval photographing operation for taking a still image, based on the output of the acceleration sensor 74 before photographing and during photographing. This example of the control is substantially a combination of the above-described "(Example of control 2-4)" and "(Example of control 2-5)".

As shown in FIG. 19, the determination unit 504, when the interval time has passed, determines whether or not the change in the output of the acceleration sensor 74 is not more than a predetermined threshold (for example, plus or minus 0.1 G) (steps S261 and S262). When the determination unit 504 has determined that the change in the output of the acceleration sensor 74 is not more than the threshold, it allows the camera 78 to perform the photographing operation (step S263).

Subsequently, the determination unit 504 determines whether the change in the output of the acceleration sensor 74 during the imaging period (exposure period) after shooting has been not more than the threshold (step S264). If the change in the output of the acceleration sensor 74 has been more than the threshold, then, the determination unit 504 waits until the change in the output of the acceleration sensor 74 becomes not more than the threshold; and after the change in the output has become not more than the threshold, it allows the camera 78 to perform the photographing operation again (steps S262 and S263). The determination unit 504 repeats the above-described operation until the change in the output of the acceleration sensor 74 becomes not more than the threshold.

Then, when it determines that the change in the output of the acceleration sensor 74 during the imaging period has been not more than the threshold, the determination unit 504 receives the image photographed by the camera 78, and sends it to the mobile terminal 30 to save (obtain) the received image (step S265).

With this example of control, it makes it possible to obtain substantially the same effect as the above-described "(Example of control 1-6)".

Third Embodiment

In the embodiments above, in camera shooting modes, the output of the gyro sensor 73 or the output of the acceleration sensor 74 has been used for the determination of whether or not the camera 78 is in the predetermined resting state. In this embodiment, output of both of the gyro sensor 73 and the acceleration sensor 74 will be used.
(Still Image Shooting Mode)
(Example of Control 3-1)

Figure 20:
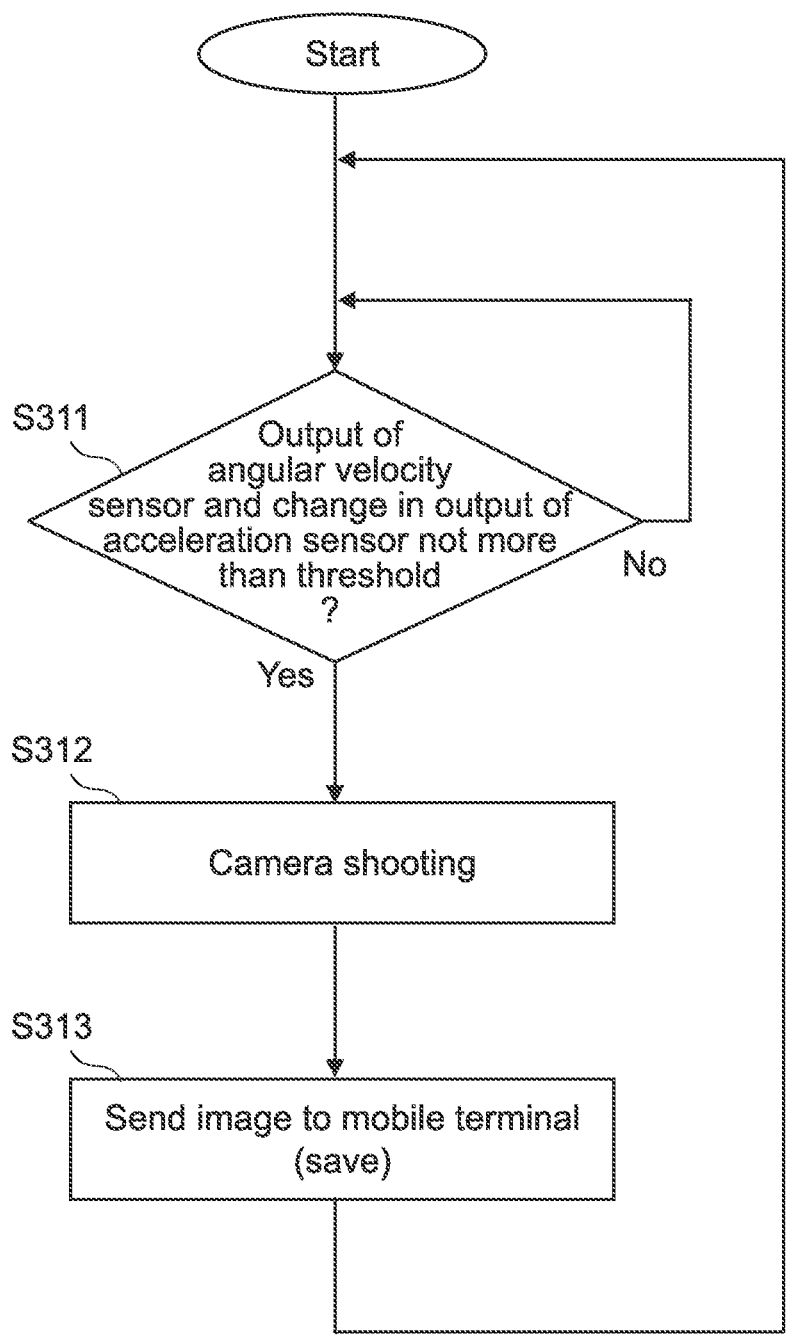
FIG. 20 is a control flow of the control box, describing a still image photographing operation using the angular velocity sensor and the acceleration sensor.

FIG. 20 is a control flow of the control box 50, describing the photographing operation for taking a still image, based on the output of both of the gyro sensor 73 and the acceleration sensor 74 before photographing.

As shown in FIG. 20, the determination unit 504, upon receiving the starting signal generated by the signal generator 503, determines whether or not the output of the gyro sensor 73 is not more than a predetermined threshold (for example, zero); and the change in the output of the acceleration sensor 74 is not more than a predetermined threshold (for example, plus or minus 0.1 G) (step S311). When the determination unit 504 has determined that the change in the output of the gyro sensor 73 and the change in the output of the acceleration sensor 74 are not more than the respective thresholds, it allows the camera 78 to perform the photographing operation (step S312). Then, the determination unit 504 receives the image photographed by the camera 78, and sends it to the mobile terminal 30 to save (obtain) the received image (step S313).

With this example of control, it makes it possible to obtain substantially the same effect as the above-described "(Example of control 1-1)" and "(Example of control 2-1)", and it is able to further increase the precision of determination of the resting state.
(Example of Control 3-2)

Figure 21:
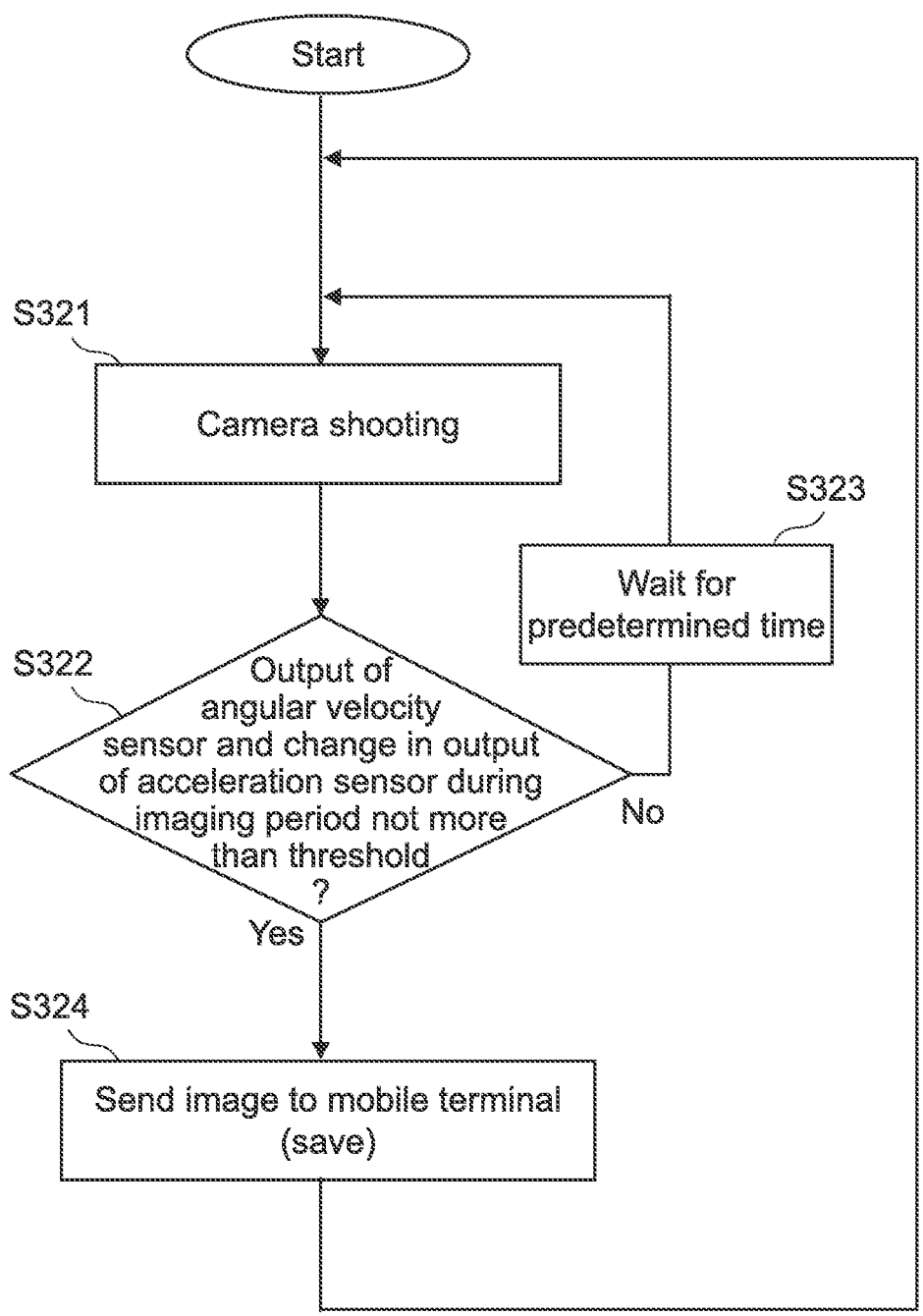
FIG. 21 is a control flow of the control box, describing a still image photographing operation using the angular velocity sensor and the acceleration sensor.

FIG. 21 is a control flow of the control box 50, describing the photographing operation for taking a still image, based on the output of both of the gyro sensor 73 and the acceleration sensor 74 during photographing.

As shown in FIG. 21, the determination unit 504, upon receiving the starting signal for the camera 78, allows the camera 78 to perform the photographing operation (step S321). Subsequently, the determination unit 504 determines whether the output of the gyro sensor 73 during the imaging period (exposure period) after shooting has been not more than the predetermined threshold (for example, zero) and the change in the output of the acceleration sensor 74 during the same period has been not more than the predetermined threshold (for example, plus or minus 0.1 G) (step S322). If the output of the gyro sensor 73 or the change in the output of the acceleration sensor 74 has been more than the corresponding threshold, then, after waiting for a predetermined time (for example, 500 msec), allows the camera 78 to perform the photographing operation again (steps S323 and S321). The determination unit 504 repeats the above-described operation until the output of the gyro sensor 73 and the change in the output of the acceleration sensor 74 become not more than the respective thresholds. Then, when it determines that the output of the gyro sensor 73 and the change in the output of the acceleration sensor 74 are not more than the respective thresholds, the determination unit 504 receives the image photographed by the camera 78, and sends it to the mobile terminal 30 to save (obtain) the received image (step S324).

With this example of control, it makes it possible to obtain substantially the same effect as the above-described "(Example of control 1-2)" and "(Example of control 2-2)", and it is able to further increase the precision of determination of the resting state.
(Example of Control 3-3)

Figure 22:
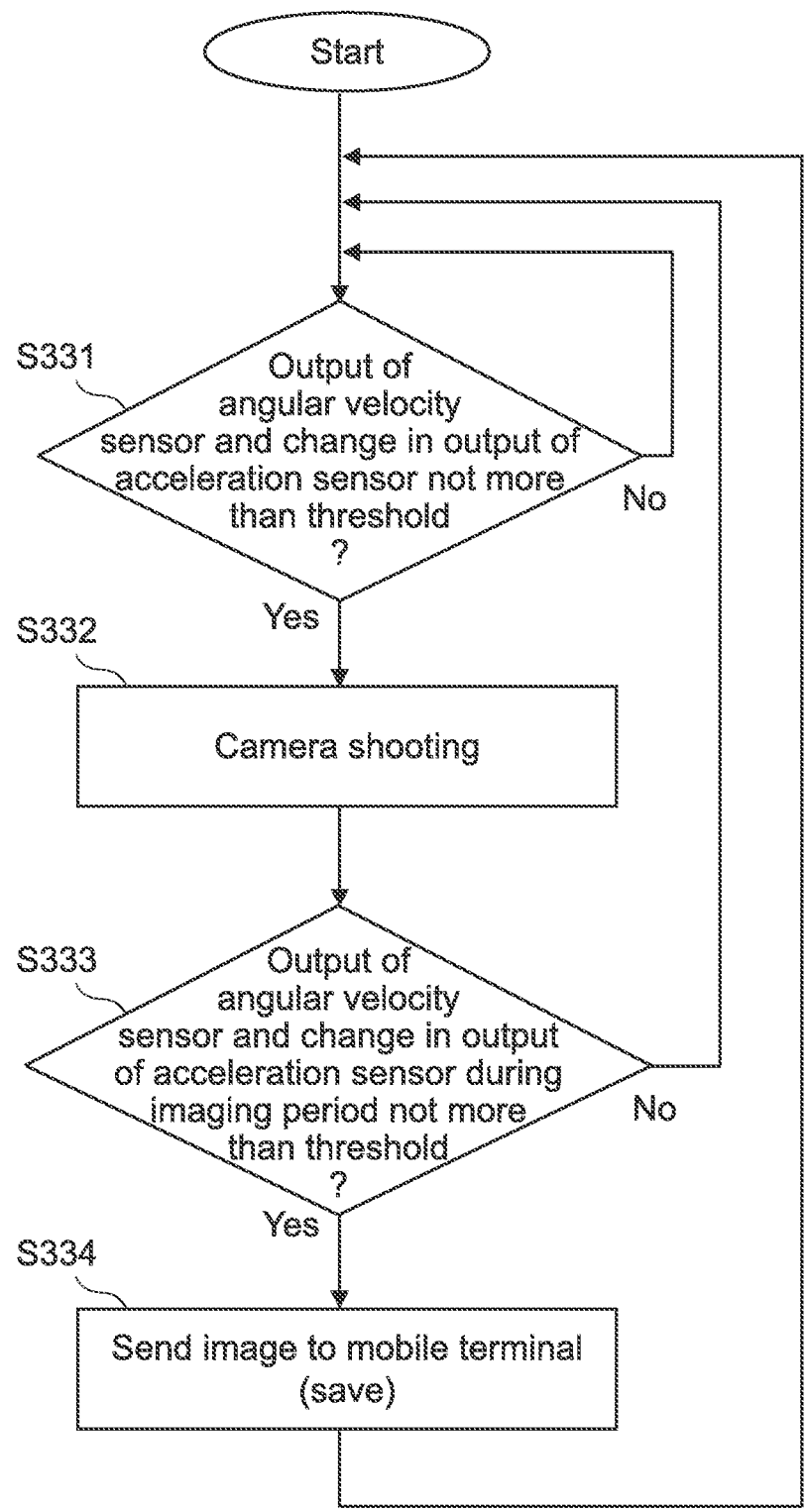
FIG. 22 is a control flow of the control box, describing a still image photographing operation using the angular velocity sensor and the acceleration sensor.

FIG. 22 is a control flow of the control box 50, describing the photographing operation for taking a still image, based on the output of both of the gyro sensor 73 and the acceleration sensor 74 before photographing and during photographing. This example of the control is substantially a combination of the above-described "(Example of control 3-1)" and "(Example of control 3-2)".

As shown in FIG. 22, the determination unit 504, upon receiving the starting signal for the camera 78, determines whether or not the output of the gyro sensor 73 is not more than a predetermined threshold (for example, zero); and the change in the output of the acceleration sensor 74 is not more than a predetermined threshold (for example, plus or minus 0.1 G) (step S331). When the determination unit 504 has determined that the output of the gyro sensor 73 and the change in the output of the acceleration sensor 74 are not more than the respective thresholds, it allows the camera 78 to perform the photographing operation (step S332).

Subsequently, the determination unit 504 determines whether the output of the gyro sensor 73 during the imaging period (exposure period) after shooting has been not more than the predetermined threshold; and the change in the output of the acceleration sensor 74 during the same period has been not more than the predetermined threshold (step S333). If the output of the gyro sensor 73 or the change in the output of the acceleration sensor 74 has been more than the corresponding threshold, then, the determination unit 504 waits until the output of the gyro sensor 73 and the change in the output of the acceleration sensor 74 become not more than the respective thresholds; and after these values have become not more than the respective thresholds, it allows the camera 78 to perform the photographing operation again (steps S331 and S332). The determination unit 504 repeats the above-described operation until the output of the gyro sensor 73 and the change in the output of the acceleration sensor 74 become not more than the respective thresholds.

Then, when it determines that the output of the gyro sensor 73 and the change in the output of the acceleration sensor 74 during the imaging period have been not more than the respective thresholds, the determination unit 504 receives the image photographed by the camera 78, and sends it to the mobile terminal 30 to save (obtain) the received image (step S334).

With this example of control, it makes it possible to obtain substantially the same effect as the above-described "(Example of control 1-3)" and "(Example of control 2-3)", and it is able to further increase the precision of determination of the resting state.

(Interval Shooting Mode)
(Example of Control 3-4)

Figure 23:
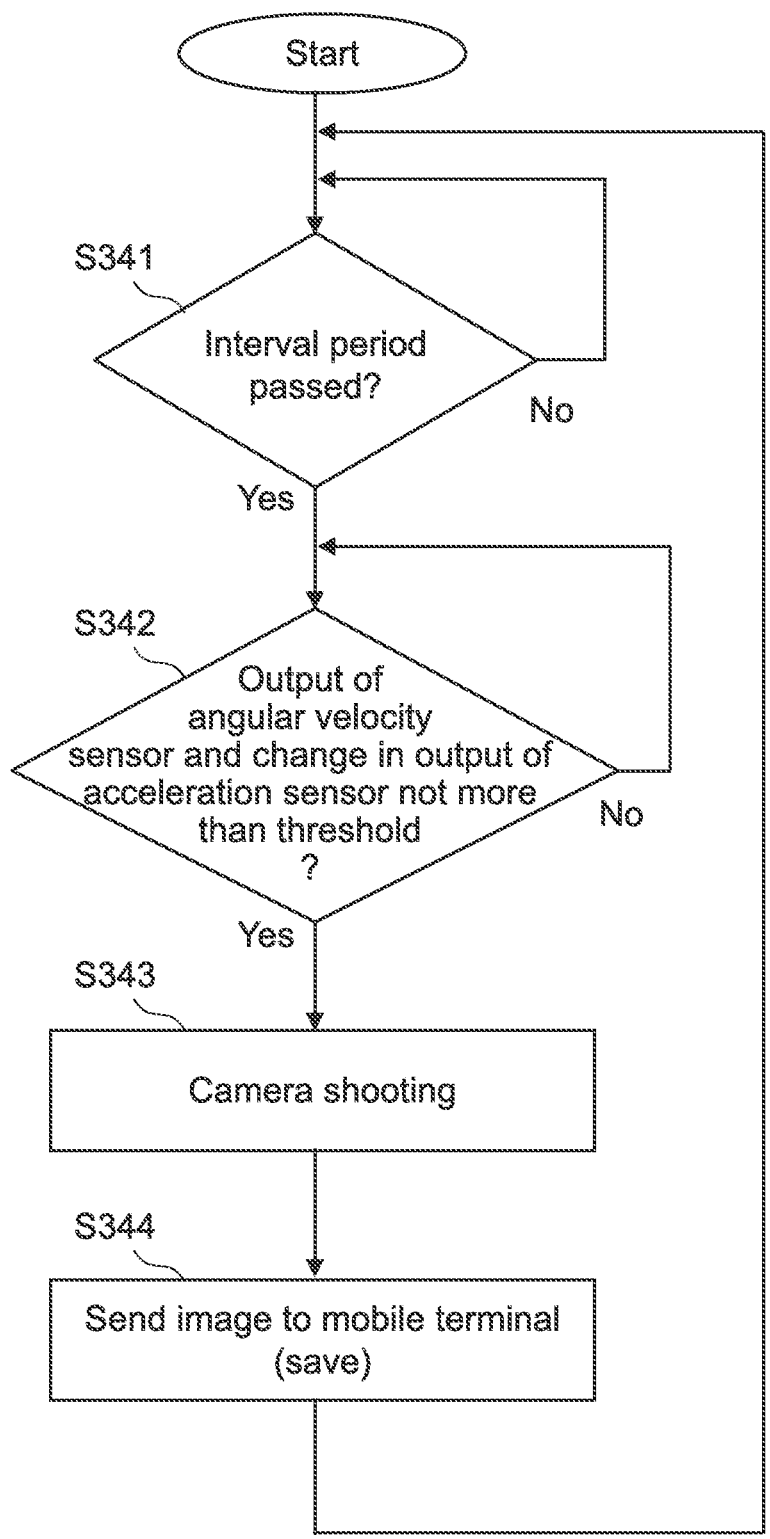
FIG. 23 is a control flow of the control box, describing an interval photographing operation using the angular velocity sensor and the acceleration sensor.

FIG. 23 is a control flow of the control box 50, describing the interval photographing operation for taking a still image, based on the output of both of the gyro sensor 73 and the acceleration sensor 74 before photographing.

As shown in FIG. 23, the determination unit 504, when the interval time has passed, determines whether or not the output of the gyro sensor 73 is not more than the predetermined threshold (for example, zero); and the change in the output of the acceleration sensor 74 is not more than the predetermined threshold (for example, plus or minus 0.1 G) (steps S341 and S342). When the determination unit 504 has determined that the output of the gyro sensor 73 and the change in the output of the acceleration sensor 74 are not more than the respective thresholds, it allows the camera 78 to perform the photographing operation (step S343). Then, the determination unit 504 receives the image photographed by the camera 78, and sends it to the mobile terminal 30 to save (obtain) the received image (step S344).

With this example of control, it makes it possible to obtain substantially the same effect as the above-described "(Example of control 1-4)" and "(Example of control 2-4)", and it is able to further increase the precision of determination of the resting state.

(Example of Control 3-5)

Figure 24:
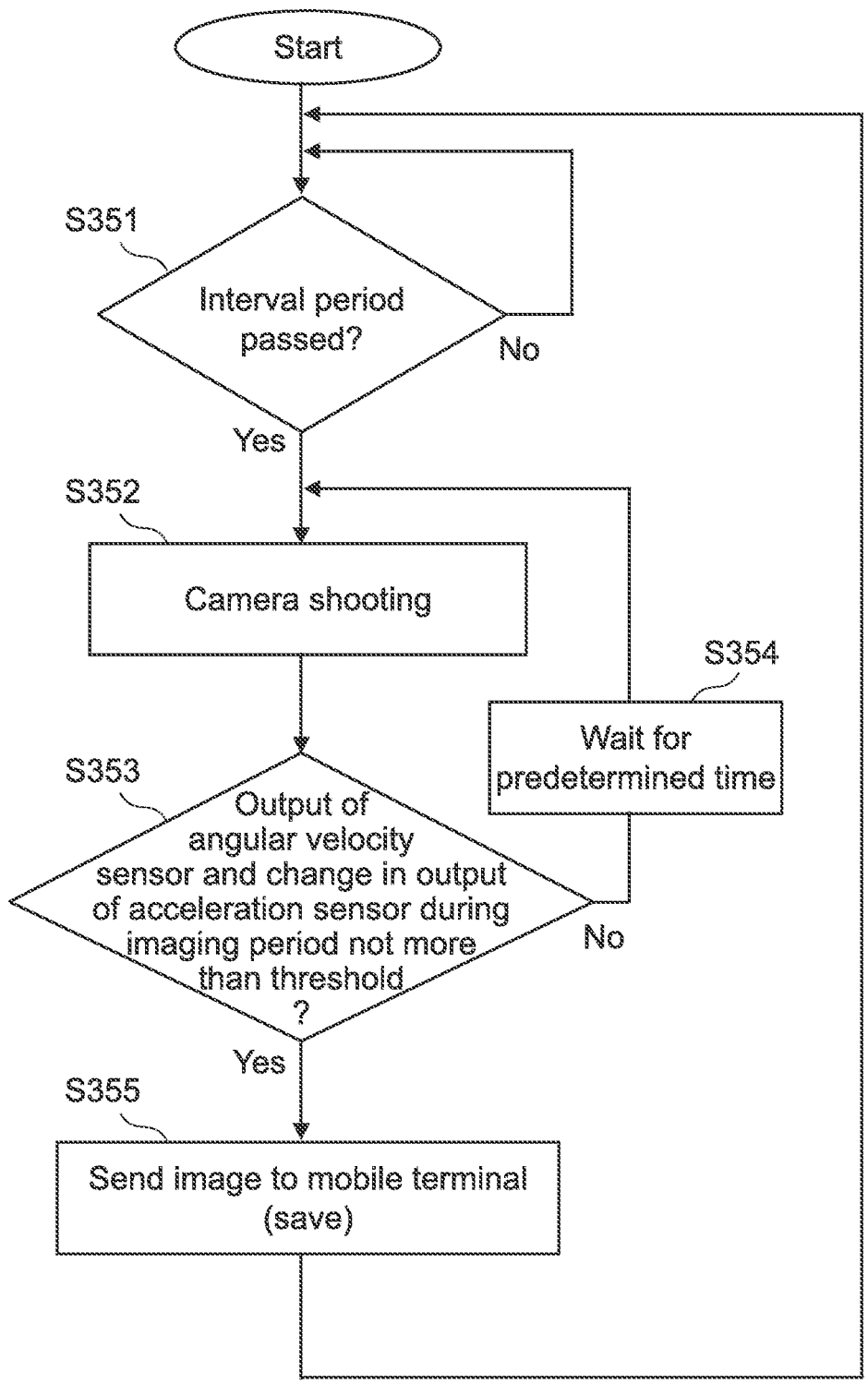
FIG. 24 is a control flow of the control box, describing an interval photographing operation using the angular velocity sensor and the acceleration sensor.

FIG. 24 is a control flow of the control box 50, describing the interval photographing operation for taking a still image, based on the output of both of the gyro sensor 73 and the acceleration sensor 74 during photographing.

As shown in FIG. 24, the determination unit 504, when the interval time has passed, allows the camera 78 to perform the photographing operation (steps S351 and S352). Subsequently, the determination unit 504 determines whether the output of the gyro sensor 73 during the imaging period (exposure period) after shooting has been not more than the predetermined threshold (for example, zero) and the change in the output of the acceleration sensor 74 during the same period has been not more than the predetermined threshold (for example, plus or minus 0.1 G) (step S353). If the output of the gyro sensor 73 or the change in the output of the acceleration sensor 74 has been more than the corresponding threshold, then, after waiting for a predetermined time (for example, 500 msec), allows the camera 78 to perform the photographing operation again (steps S354 and S355). The determination unit 504 repeats the above-described operation until the output of the gyro sensor 73 and the change in the output of the acceleration sensor 74 become not more than the respective thresholds. Then, when it determines that the output of the gyro sensor 73 and the change in the output of the acceleration sensor 74 are not more than the respective thresholds, the determination unit 504 receives the image photographed by the camera 78, and sends it to the mobile terminal 30 to save (obtain) the received image (step S355).

With this example of control, it makes it possible to obtain substantially the same effect as the above-described "(Example of control 1-5)" and "(Example of control 2-5)", and it is able to further increase the precision of determination of the resting state.

(Example of Control 3-6)

Figure 25:
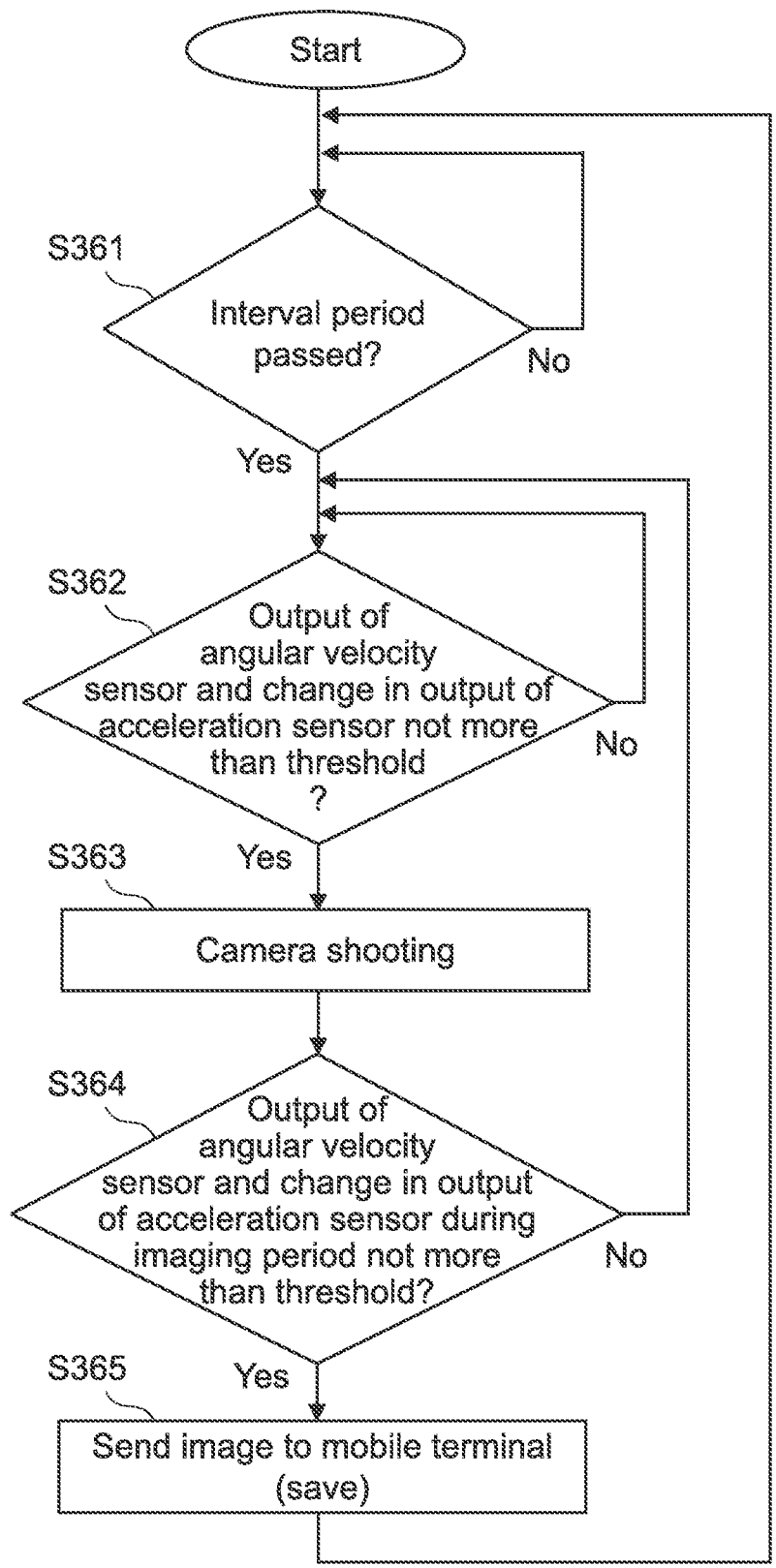
FIG. 25 is a control flow of the control box, describing an interval photographing operation using the angular velocity sensor and the acceleration sensor.

FIG. 25 is a control flow of the control box 50, describing the interval photographing operation for taking a still image, based on the output of both of the gyro sensor 73 and the acceleration sensor 74 before photographing and during photographing. This example of the control is substantially a combination of the above-described "(Example of control 3-4)" and "(Example of control 3-5)".

As shown in FIG. 25, the determination unit 504, when the interval time has passed, determines whether or not the output of the gyro sensor 73 is not more than the predetermined threshold (for example, zero); and the change in the output of the acceleration sensor 74 is not more than a predetermined threshold (for example, plus or minus 0.1 G) (steps S361 and S362). When the determination unit 504 has determined that the output of the gyro sensor 73 and the change in the output of the acceleration sensor 74 are not more than the respective thresholds, it allows the camera 78 to perform the photographing operation (step S363).

Subsequently, the determination unit 504 determines whether the output of the gyro sensor 73 during the imaging period (exposure period) after shooting has been not more than the predetermined threshold; and the change in the output of the acceleration sensor 74 during the same period has been not more than the predetermined threshold (step S364). If the output of the gyro sensor 73 or the change in the output of the acceleration sensor 74 has been more than the corresponding threshold, then, the determination unit 504 waits until the output of the gyro sensor 73 and the change in the output of the acceleration sensor 74 become not more than the respective thresholds; and after these values have become not more than the respective thresholds, it allows the camera 78 to perform the photographing operation again (steps S362 and S363). The determination unit 504 repeats the above-described operation until the output of the gyro sensor 73 and the change in the output of the acceleration sensor 74 become not more than the respective thresholds.

Then, when it determines that the output of the gyro sensor 73 and the change in the output of the acceleration sensor 74 during the imaging period have been not more than the respective thresholds, the determination unit 504 receives the image photographed by the camera 78, and sends it to the mobile terminal 30 to save (obtain) the received image (step S365).

With this example of control, it makes it possible to obtain substantially the same effect as the above-described "(Example of control 1-6)" and "(Example of control 2-6)", and it is able to further increase the precision of determination of the resting state.

The present disclosure is not limited to the embodiments described above and can be modified in various ways without departing from the gist of the present disclosure, as a matter of course.

For example, the above-described embodiments have been configured to determine the resting state of the camera 78 immediately before photographing the still image by the camera 78 or during photographing. Instead of this, it is also possible to determine whether or not the camera 78 is in the resting state, on the basis of an output of the motion sensor 702 immediately after photographing the still image by the camera 78; and then execute the control of acquisition of an image, depending on the result of this determination.

The camera 78 may be equipped with an electronic zoom function. In this case, the threshold value regarding the output of the gyro sensor 73 or the change in the output of the acceleration sensor 74, which is the criterion of whether or not the camera 78 is in the predetermined resting state, may be set as a variable that changes with a zoom value (zoom condition) of the camera 78. For example, the threshold may be set smaller (narrow-ranged) in a wide-angle state than in a telephoto state.

The camera 78 may be equipped with a camera shake correction function. In this case, the control unit may obtain from the camera a value indicating a degree of success in the correction, and determine whether to retry photographing by taking this value into consideration. For example, also in cases where the output of the gyro sensor has exceeded the threshold, it may not need to retry photographing if the information obtained from the camera indicates that the correction has been successfully performed.

It may be configured such that, when the user does not input any operation after setting to the still image shooting mode, photographing may be automatically performed when the predetermined resting state is maintained for a predetermined time.

It is possible that a biological information acquisition means is installed in the attachment unit, and the photographing control as described above is executed based on biological data such as brain waves.

In the above examples of control 1-6 (FIG. 13), 2-6 (FIG. 19) and 3-6 (FIG. 25), when the attachment unit 701 has not been in the predetermined resting state, the determination is performed again regarding whether the camera 78 is currently in the resting state. Alternatively, the determination of the resting may be performed again after waiting for a predetermined time (for example, 500 msec).

In the above examples of control 1-3 (FIG. 10), 1-6 (FIG. 13), 2-3 (FIG. 16), 2-6 (FIG. 19), 3-3 (FIG. 22) and 3-6 (FIG. 25), the threshold of the output of the sensor before photographing and that during photographing have been the same value. However, the thresholds with respect to before photographing and during photographing may be different values.

As the still image to be sent from the control box 50 to the mobile terminal 30, information regarding situation of photographing of the image may be sent together with the image. In this case, the mobile terminal 30 may save the image and such information in association with each other. Examples of the information regarding situation of photographing of the image include a photographing place, a photographing time, and an output value from the motion sensor at the time of obtaining the image, and the like.

In this case, the control box 50 may be configured to select an image, based on information of an angular velocity or acceleration at the time of photographing the image, the information being attached to the image; and send the selected image to the mobile terminal 30. For example, by setting relatively lax condition as the criterion for determining the resting state at the time of photographing, and by setting relatively strict condition for that at the time of sending the image, it makes it possible to obtain substantially the same effect as the above-described embodiments. The criteria at the time of photographing and sending may be adjustable optionally by the user. This makes it possible to select and save the images which meet the user's need.

Alternatively, the selection of the image may be performed by the mobile terminal 30. Also in this case, it is possible to perform filtering on the images by referring to the information of the angular velocity or acceleration at the time of photographing the image, the information being attached to the image.

Although the imaging apparatus (wearable device) provided with the shutter button 531 has been described as an example in the above embodiment, the present disclosure may also be applied to an imaging apparatus without the shutter button.

Further, examples of the automatic imaging apparatuses for interval photographing according to the present disclosure are not limited to those to be used attached to the human body, but may include those installed to unmanned robots for the purpose of space, geological or offshore exploration; and those to be attached to wild animals for the purpose of biological research In addition, a wearable device having an interval photographing function may be configured in the following manner.

[1] A wearable device including:
an attachment unit having a display and an imaging unit, the attachment being configured to be attachable to the user;
a motion sensor configured to detect a spatial movement of the imaging unit; and
a control unit configured to allow the imaging unit to perform a photographing operation at a predetermined timing regardless of absence of any input operation by the user,
the control unit being further configured to determine whether or not the imaging unit is in a predetermined resting state, based on an output of the motion sensor, and when the imaging unit is not in the predetermined resting state, make a correction on a photographing operation of the imaging unit.

[2] The wearable device according to [1], in which the control unit allows the imaging unit to perform the photographing operation every time a predetermined time passes.

[3] The wearable device according to [1] or [2], in which the control unit determines whether or not the imaging unit is in the predetermined resting state, based on the output of the motion sensor, and does not allow the imaging unit to perform the photographing operation when the imaging unit is not in the predetermined resting state.

[4] The wearable device according to [3], in which the control unit determines whether or not the imaging unit is in the predetermined resting state, based on the output of the motion sensor, and when the imaging unit is not in the predetermined resting state, the control unit does not allow the imaging unit to perform the photographing operation, but waits until the imaging unit becomes in the predetermined resting state, based on the output of the motion sensor, and allows the imaging unit to perform the photographing operation after waiting.

[5] The wearable device according to any one of [1] to [4], in which
the control unit determines whether or not the imaging unit is in the predetermined resting state, based on the output of the motion sensor, and when the imaging unit is not in the predetermined resting state, the control unit allows the imaging unit to perform the photographing operation, waits until the imaging unit becomes in the predetermined resting state, based on the output of the motion sensor, and allows the imaging unit to perform an additional photographing operation after waiting.

[6] The wearable device according to any one of [2] to [5], in which
the control unit, after allowing the imaging unit to perform the photographing operation, sets the imaging unit to an energy-saving mode, restart the imaging unit before the predetermined time passes, and allows the imaging unit to perform the photographing operation after the predetermined time passes.

[7] The wearable device according to any one of [1] to [6], in which the imaging unit is formed integrally with the attachment unit, and the motion sensor is installed in the attachment unit.

[8] The wearable device according to any one of [1] to [7], in which the control unit is configured to be capable of displaying on the display an advance notice of photographing, or cancelling the display of the advance notice manually, before allowing the imaging unit to perform the photographing operation.

[9] The wearable device according to any one of [1] to [8], in which the imaging unit has an illuminance sensor, and on the basis of an output of the illuminance sensor, the control unit changes determination conditions for determining whether or not the imaging unit is in the predetermined resting state based on the output of the motion sensor.

[10] The wearable device according to any one of [1] to [9], in which the imaging unit has a zoom function, and on the basis of a zoom condition, the control unit changes determination conditions for determining whether or not the imaging unit is in the predetermined resting state based on the output of the motion sensor.

[11] The wearable device according to any one of [1] to [10], in which the imaging unit has a function of changing imaging conditions, and the control unit determines whether or not the imaging unit is in the predetermined resting state based on the output of the motion sensor, and changes the imaging conditions, depending on the result of determination.

[12] The wearable device according to [11], in which the imaging unit has a zoom function, and the control unit determines whether or not the imaging unit is in the predetermined resting state based on the output of the motion sensor, and changes a zoom condition, depending on the result of determination.

[13] The wearable device according to [11], in which the control unit determines whether or not the imaging unit is in the predetermined resting state based on the output of the motion sensor, and changes a shutter speed or a state of a diaphragm, depending on the result of determination.

The present disclosure may also have the following configurations.

(1) A wearable device including:

an attachment unit having a display and an imaging unit, the attachment unit being configured to be attachable to the user;

a motion sensor configured to be capable of detecting a spatial movement of the imaging unit; and a control unit configured to determine whether or not the imaging unit is in a predetermined resting state, based on an output of the motion sensor, and when the imaging unit is not in the predetermined resting state, limit a photographing operation of the imaging unit.

(2) The wearable device according to (1), in which the control unit has a signal generator configured to generate a starting signal for starting the imaging unit, every time a predetermined time passes, and a determination unit configured to determine whether or not the imaging unit is in the predetermined resting state, when the starting signal is generated, the determination unit being configured to permit acquisition of an image when the imaging unit is in the predetermined resting state, and inhibit the acquisition of an image when the imaging unit is not in the predetermined resting state.

(3) The wearable device according to (2), in which the determination unit is configured to determine whether or not the imaging unit is in the predetermined resting state, after the starting signal is generated and before the photographing operation of the imaging unit is performed.

(4) The wearable device according to (2), in which determination unit is configured to determine whether or not the imaging unit is in the predetermined resting state, after the photographing operation of the imaging unit is performed.

(5) The wearable device according to (4), in which the determination unit is configured to determine the predetermined resting state, according to whether or not the imaging unit has been in the predetermined resting state during an exposure period of the imaging unit.

(6) The wearable device according to any one of (2) to (5), in which the determination unit is configured to, when determined that the imaging unit is not in the predetermined resting state, inhibit starting of the imaging unit until the imaging unit becomes in the predetermined resting state.

(7) The wearable device according to any one of (2) to (5), in which the determination unit is configured to, when determined that the imaging unit is not in the predetermined resting state, invalidate a photographing operation of the imaging unit until the imaging unit becomes in the predetermined resting state.

(8) The wearable device according to (1), further including an operation unit to be operated by an input operation by a user;

the control unit having a determination unit to detect an input of the operation unit, the determination unit being configured to determine whether or not the imaging unit is in the predetermined resting state, when the operation unit is operated, the determination unit being further configured to permit acquisition of an image by the imaging unit when the imaging unit is in the predetermined resting state, and inhibit the acquisition of an image when the imaging unit is not in the predetermined resting state.

(9) The wearable device according to (8), in which the determination unit is configured to determine whether or not the imaging unit is in the predetermined resting state, after detecting the input of the operation unit and before the photographing operation of the imaging unit is performed.

(10) The wearable device according to (8), in which the determination unit is configured to determine whether or not the imaging unit is in the predetermined resting state, after the photographing operation of the imaging unit is performed.

(11) The wearable device according to (10), in which the determination unit is configured to determine the predetermined resting state, according to whether or not the imaging unit has been in the predetermined resting state during an exposure period of the imaging unit.

(12) The wearable device according to any one of (8) to (11), in which
the determination unit is configured to, when determined that the imaging unit is not in the predetermined resting state, inhibit starting of the imaging unit until the imaging unit becomes in the predetermined resting state.

(13) The wearable device according to any one of (8) to (11), in which
the determination unit is configured to, when determined that the imaging unit is not in the predetermined resting state, invalidate a photographing operation of the imaging unit; and after a predetermined time has passed, determine again whether or not the imaging unit is in the predetermined resting state.

(14) The wearable device according to any one of (1) to (13), in which
the control unit further has an image transmitting unit configured to send the image photographed by the imaging unit to an external apparatus.

(15) The wearable device according to any one of (1) to (14), in which
the motion sensor includes an angular velocity sensor.

(16) The wearable device according to any one of (1) to (15), in which
the motion sensor includes an acceleration sensor.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 30 mobile terminal
50 control box
70 wearable device
73 gyro sensor
74 acceleration sensor
78 camera
503 signal generator
504 determination unit
505 image transmitting unit
701 attachment unit
702 motion sensor

The invention claimed is:
1. An information processing apparatus, comprising:
an image capturing device;
a motion sensor configured to:
detect a spatial movement of the image capturing device; and
generate an output signal based on the detection of the spatial movement, wherein the output signal indicates and output value of the detected spatial movement of the image capturing device; and
circuitry configured to:
control the image capturing device to capture an image based on an elapse of a time interval, wherein a start of the time interval is calculated from a time of capture of a last photographed image by the image capturing device;
control the image capturing device to capture the image based on the output value that is less than a threshold value; and
control the image capturing device to capture the image after a specific time, wherein the image capturing device is controlled based on the output value that is more than the threshold value.

2. The information processing apparatus according to claim 1, wherein the circuitry is further configured to control the image capturing device to inhibit the capture of the image until the output value is less than the threshold value during an exposure period.

3. The information processing apparatus according to claim 2, wherein the circuitry is further configured to:
control the image capturing device to capture the image based on the output value that is less than the threshold value, and
store the image in a storage device.

4. The information processing apparatus according to claim 1, wherein the circuitry is further configured to:
determine a resting state of the image capturing device based on the output value that is less than the threshold value; and
control the image capturing device to capture the image based on the determination of the resting state of the image capturing device.

5. The information processing apparatus according to claim 1, wherein
the circuitry is further configured to determine a change in the output value during an exposure time period of the image capturing device, and
the exposure time period is a time period during the capture of the image.

6. The information processing apparatus according to claim 1, wherein the circuitry is further configured to:
determine, based on the output value, whether the image capturing device is in a specific resting state;
control the image capturing device to capture the image based on the determination that the image capturing device is in the specific resting state; and
control the image capturing device to capture the image after the specific time based on the determination that the image capturing device is not in the specific resting state.

7. The information processing apparatus according to claim 1, wherein the motion sensor comprises an angular velocity sensor.

8. The information processing apparatus according to claim 1, wherein the motion sensor comprises an acceleration sensor.

9. The information processing apparatus according to claim 1, wherein the information processing apparatus is a wearable device.

* * * * *